US 6,640,410 B2

(12) United States Patent
Harmand et al.

(10) Patent No.: US 6,640,410 B2
(45) Date of Patent: Nov. 4, 2003

(54) LINE TRANSFER SYSTEM WITH A CONTOUR MACHINING HEAD

(75) Inventors: Brice Harmand, La Jolla, CA (US); Pierre Harmand, Annecy (FR)

(73) Assignee: Harmand Family Limited Partnership, San Diego, CA (US)

( * ) Notice: Subject to any disclaimer, the term of this patent is extended or adjusted under 35 U.S.C. 154(b) by 0 days.

(21) Appl. No.: 10/201,581

(22) Filed: Jul. 22, 2002

(65) Prior Publication Data
US 2003/0059266 A1 Mar. 27, 2003

Related U.S. Application Data

(63) Continuation-in-part of application No. 09/828,543, filed on Apr. 6, 2001, now Pat. No. 6,530,727, which is a continuation-in-part of application No. 09/521,333, filed on Mar. 9, 2000, now Pat. No. 6,382,883, which is a continuation-in-part of application No. 09/153,766, filed on Sep. 15, 1998, now Pat. No. 6,086,293.
(60) Provisional application No. 60/306,725, filed on Jul. 20, 2001, and provisional application No. 60/081,481, filed on Apr. 13, 1998.

(51) Int. Cl.7 .......................... B23Q 17/00; B23B 35/00; B23B 47/00
(52) U.S. Cl. ................................ 29/407.08; 29/888.44; 408/1 R; 408/82; 408/83.5; 408/143; 409/141; 74/573 R
(58) Field of Search .................... 29/407.08, 888.41, 29/890.122, 35.5, 36, 39, 41; 408/1 R, 3, 16, 82, 83.5, 143, 147, 150–152, 186, 238; 409/131, 141, 234; 74/573 R; 483/1, 15, 32

(56) References Cited

U.S. PATENT DOCUMENTS 897,041 A    8/1908   Weller (List continued on next page.)

FOREIGN PATENT DOCUMENTS

DE    825783 C    12/1951

(List continued on next page.)

OTHER PUBLICATIONS

Newen, Contour EPOC brochure: "On All Circuits and For All O.E.M.s, Advanced Techniques Are Essential," 2001.
Narex Automatic Boring & Facing Heads 1998 Catalog p. 2102.

Primary Examiner—Gregory Vidovich
Assistant Examiner—Essama Omgba
(74) Attorney, Agent, or Firm—Kilpatrick Stockton LLP

(57) ABSTRACT

A line transfer system with a contour machining head. The system includes a transmission arbor, a housing, a contour machining head, a driving system, and a system controller. The transmission arbor mounts within the housing, with the transmission arbor and housing sharing a common central axis. At least one contour machining head mounts to the housing. The contour machining head includes a bit tool, a slidable carriage, a linkage, a counterweight, and a pilot. The bit tool is configured for machining the workpiece, and mounts to the slidable carriage. The linkage connects to the carriage and transfers a force from the transmission arbor to the slidable carriage resulting in an independent radial movement of the bit tool with respect to the central axis. The counterweight links to the transmission arbor to dynamically counterbalance the radial movement of the slidable carriage and bit tool. Finally, the pilot connects to the contour machining head and aligns the contour machining head with the workpiece. The driving system mounts to the housing, and is configured for providing a force to the transmission arbor; providing a force to the contour machining head resulting in an independent axial movement of the bit tool with respect to the central axis; and providing a force to the contour machining head resulting in an independent rotational movement of the bit tool with respect to the central axis. The system controller is configured to control the force applied by the driving system and the movement of the bit tool.

24 Claims, 23 Drawing Sheets

U.S. PATENT DOCUMENTS

| | | | |
|---|---|---|---|
| 2,660,463 | A | 11/1953 | Briney, Jr. |
| 2,693,965 | A | 11/1954 | Briney, Jr. |
| 2,875,390 | A | 2/1959 | Tripp |
| 2,901,927 | A | 9/1959 | Morgan |
| 3,002,404 | A | 10/1961 | Estabrook |
| 3,109,329 | A | 11/1963 | Knosp et al. |
| 3,125,796 | A | 3/1964 | Brainard |
| 3,259,957 | A | 7/1966 | Stobbe |
| 3,273,182 | A | 9/1966 | McDonald |
| 3,311,003 | A | 3/1967 | Daugherty |
| 3,548,172 | A | 12/1970 | Centner et al. |
| 3,559,256 | A | 2/1971 | Lemelson |
| 3,605,909 | A | 9/1971 | Lemelson |
| 3,685,022 | A | 8/1972 | Raynes |
| 3,728,940 | A | 4/1973 | Peterson |
| 3,730,636 | A | 5/1973 | Mizoguchi |
| 4,147,462 | A | 4/1979 | Appleby |
| 4,386,532 | A | 6/1983 | Benjamin |
| 4,400,118 | A | 8/1983 | Yamakage et al. |
| 4,545,706 | A | 10/1985 | Hiroyasu |
| 4,555,205 | A | 11/1985 | Hiroyasu |
| 4,611,958 | A | 9/1986 | Vasilchenko |
| 4,624,607 | A | 11/1986 | Kato et al. |
| 4,630,977 | A | 12/1986 | Theofanous |
| 4,643,623 | A | 2/1987 | Kondo |
| 4,678,379 | A | 7/1987 | Sunday |
| 4,716,657 | A | 1/1988 | Collingwood |
| 4,753,556 | A | 6/1988 | Solko |
| 4,778,313 | A | 10/1988 | Lehmkuhl |
| 4,789,280 | A | 12/1988 | Dobat |
| 4,792,265 | A | 12/1988 | Rottler |
| 4,836,719 | A | 6/1989 | Field |
| 4,842,452 | A | 6/1989 | Strait |
| 4,872,789 | A | 10/1989 | Field |
| 4,913,601 | A | 4/1990 | Tenand |
| 4,966,460 | A | 10/1990 | Kahley |
| 5,001,871 | A | 3/1991 | Harmand |
| 5,017,062 | A | 5/1991 | Leroux |
| 5,044,841 | A | 9/1991 | Biera |
| 5,125,299 | A | 6/1992 | Strait |
| 5,302,057 | A | 4/1994 | Siegfried |
| 5,399,058 | A | 3/1995 | Harmand |
| 5,439,329 | A | 8/1995 | Marron |
| 5,445,478 | A | 8/1995 | Ordogh |
| 5,533,847 | A | 7/1996 | Basteck |
| 5,613,809 | A | 3/1997 | Harmand |
| 5,620,284 | A | 4/1997 | Ueda et al. |
| 5,725,335 | A | 3/1998 | Harmand |
| 5,769,576 | A | 6/1998 | Gerard |
| 5,829,928 | A | 11/1998 | Harmand |
| 6,010,440 | A | 1/2000 | Miyano |
| 6,029,098 | A | 2/2000 | Serizawa et al. |
| 6,086,293 | A | 7/2000 | Harmand |
| 6,151,773 | A | 11/2000 | Dornieden et al. |
| 6,178,637 | B1 | 1/2001 | Herold et al. |
| 6,382,883 | B1 | 5/2002 | Harmand |
| 6,382,884 | B1 | 5/2002 | Harmand |
| 6,471,453 | B1 * | 10/2002 | Winebrenner et al. ...... 409/141 |
| 6,530,727 | B2 * | 3/2003 | Harmand et al. ........... 408/1 R |

FOREIGN PATENT DOCUMENTS

| | | |
|---|---|---|
| DE | 4322435 A1 | 1/1995 |
| EP | 0300959 | 1/1989 |
| EP | 0 467 372 A2 | 1/1992 |
| FR | 2 383 738 | 10/1978 |
| WO | WO 9204152 | 3/1992 |
| WO | WO 9602346 A1 | 2/1996 |

* cited by examiner

LINE TRANSFER SYSTEM WITH A CONTOUR MACHINING HEAD

RELATED U.S. APPLICATIONS

This application is a continuation-in-part of application Ser. No. 09/828,543 filed Apr. 6, 2001, Publication No. U.S. 2001/0018012 A1, now U.S. Pat. No. 6,530,727, which is a continuation-in-part of application Ser. No. 09/521,333, filed Mar. 9, 2000, now U.S. Pat. No. 6,382,883, which is a continuation-in-part of application Ser. No. 09/153,766, filed Sep. 15, 1998, now issued as U.S. Pat. No. 6,086,293, which claims the benefit of priority to U.S. provisional application Serial No. 60/081,481, filed Apr. 13, 1998. This application also claims the benefit of priority to U.S. provisional application Serial No. 60/306,725, filed Jul. 20, 2001. The disclosure of each related application is incorporated herein by reference in its entirety.

FIELD OF THE INVENTION

The invention is directed generally to machinery, and more particularly to a line transfer system with a contour machining head.

BACKGROUND OF THE INVENTION

Machining of materials to create openings or recesses of different shapes is used in the manufacture and repair of a wide range of objects. In applications where the dimensional tolerances, roundness and smoothness of the machined surface are important, special tools are often required, especially when the material to be machined is very hard or otherwise difficult to machine. For example, transfer machines within an automated manufacturing line often require multiple machining heads with a variety of different cutting bits to form rounded openings of the desired profiles. The more different machining heads required in a transfer machine, the more complex the machine becomes, and the more floor space it requires. As an alternative to multiple machining heads, a single cutting machine can be adapted to receive a variety of different cutting bits. However, when the cutting bit needs to be changed, the processing line must be paused or shut down, resulting in reduced throughput.

In an exemplary application, such cutting tools are used in the repair of the cylinders heads of internal combustion engines to re-establish the high quality seal required for efficient engine performance and fuel consumption. It is well known among vehicle mechanics that valve seats can be machined to remove the outer surface of the seat to expose a smooth and uniform contact surface by a technique commonly referred to as "lapping". This lapping technique is accomplished by removing the cylinder head from the engine and machining the valve seats with a cutting blade. Typically, a valve seat has a profile with three different angles: a throat angle, a valve seat angle, and a top angle. In order to simultaneously cut the different angles, a "three-angle" cutting blade or bit is used. Each cutting edge of the three-angle cutting bit corresponds to one of the valve seat angles to be machined. Three-angle cutting bits vary in size and shape depending on the type of cylinder head valve seat being machined. These three-angle cutting bits are currently used by valve seat and guide manufacturers.

A disadvantage of the lapping technique is the risk of damage to the surface finish from vibration, chattering, or undulation generated by flexion of the cutting bits. This problem develops because certain cylinder head valve seat shapes require a three-angle cutting bit with a long cutting edge. Rotation of this long cutting edge when the edge is in contact with the work surface can create flexions in the cutting bit, especially when the material is difficult to machine, i.e., a very hard material. These flexions generate vibrations, chattering, or undulations which can disrupt contact between the cutting edge and the surface being cut. The skipping blade can damage the surface finish of the valve seat resulting in a machined valve seat that is not acceptable by Original Equipment Manufacturer (OEM) standards.

Another disadvantage of the lapping technique is a decentering phenomena. As stated above, cutting efforts with a long cutting edge/surface create flexions. These flexions create an unbalanced radial cutting effort which decenters the three-angle cutting blade, also resulting in unacceptable quality.

Still another disadvantage of the lapping technique is the large number of three-angle cutting blades needed to machine different types of valve seats. Each type of engine has a different valve seat profile. Thus, one or more unique three-angle cutting blades may be needed for each type of engine.

Finally, many conventional cutting machines operate at high rotational speeds with numerous moving parts. Numerous moving parts rotating at high speeds can cause weight imbalances within a conventional cutting machine, adversely affecting the stability of the cutting machine and potentially affecting the precision cutting operations of the cutting machine. Thus, there is a need for a precision cutting machine that can operate at high rotational speeds while compensating for the weight of its numerous moving parts.

Furthermore, conventional cutting machines lack the capability to perform a variety and wide range of cutting operations needed to simultaneously form complex lines and shapes in one or more workpieces in a relatively efficient manner. Thus, there is a need for a precision cutting machine that can be adjusted to perform a variety and wide range of cutting operations needed to simultaneously form complex lines and shapes in one or more workpieces in a relatively efficient manner.

Moreover, in a conventional cutting machine, a pilot may be used to guide or center a cutting blade or tip with respect to the workpiece. For example, a pilot can be inserted into a valve guide in order to align the bit tool with the valve seat to be machined. When needed, the pilot may be changed by an operator according to the size or configuration of the workpiece to be machined. In some instances, a pilot is secured to the cutting machine by a deformable hydraulic sleeve system. A screw actuated by an operator pushes a piston which, in turn, compresses oil trapped in a chamber. The chamber includes a membrane sleeve that surrounds and wraps around the pilot shank. As the oil pressure increases in the membrane sleeve, the pressure applies inward compression on the pilot shank from all directions, firmly holding the pilot shank in place. To change the pilot, the screw must be manually loosened to relieve the pressure in the membrane sleeve, and then the pilot can be removed. However, replacing the pilot in a conventional cutting machine can be rather difficult and time consuming since the screw must be manually adjusted by an operator to properly tension and untension the screw to secure and release the pilot. In some instances, the operator may fail to properly tension or untension the screw to secure or release the pilot, thus wasting time. Therefore, a need exists for a cutting machine with an apparatus that permits a pilot to be changed in an efficient manner.

Further, in a cutting operation with a conventional cutting machine, the insertion of a pilot within a valve guide or other guide bore is typically a manually performed operation. For example, usually an operator of a cutting machine visually locates a valve guide, and then manually aligns the pilot of the cutting machine with the valve guide. When the pilot and valve guide are aligned, the operator manually lowers and inserts the pilot into the valve guide prior to machining the workpiece. This manually performed operation can be time consuming and inefficient for operators if the alignment is not properly performed the first time, or if the operator lacks coordination, experience or skill in aligning a pilot with a valve guide or other guide bore.

In the case of a fully automated (numerically controlled axis), i.e. a machine with all the movements of the head controlled by motors, the automated insertion of the pilot within valve guides or other guide bores presents other difficulties. For example, in order to insert a pilot within a valve guide, the pilot must be aligned precisely with the valve guide, with a precision leveling device within a micron tolerance, both in the x and y axes. When the machining head of the cutting machine is moved manually by an operator who can visually locate the valve guide, the alignment occurs naturally, "by itself", since the machining head is free to align itself with the pilot. However, in the case of automated movement, the system controller and motors do not know where, exactly, the valve guide is located. This problem is compounded by the fact that the positioning tolerance of a valve guide in a cylinder head is typically within 0.1 mm or less. Other valve guides or guide bores tolerances will have similar requirements.

Once the tip of the pilot has been engaged within the valve guide, it is critical to be able to continue the downward movement to insert the pilot fully within the valve guide. This is another problem since the valve guide is not necessarily vertical, while the downward movement of the pilot is perfectly vertical. In fact, the valve guide may not even be straight. Therefore, there is a need for a cutting machine with an apparatus that permits a pilot to be aligned with a workpiece in an efficient manner.

Finally, in a cutting operation with a conventional cutting machine, an operator may want to assess the quality of the cutting operation with a particular bit tool. For example, an operator performing a valve seat machining operation may want to assess whether the valve seat profile has been fully and properly cut. If the cutting effort by the bit tool is too great, i.e., creating a significant amount of strain on the bit tool, the cutting machine may automatically stop to prevent breakage of the bit tool or cutting machine. Such an instance might be where the bit tool is encountering excessive resistance due to the hardness of the workpiece material. Alternatively, if the cutting effort by the bit tool is insufficient, the cutting machine may automatically add additional machining cycles until the cutting operation has been completed according to predetermined parameters. Thus, there is a need for a cutting machine that determines the quality of a cutting operation with a particular bit tool.

In view of the aforementioned inadequacies of the prior art, the need exists for cutting tools and methods for machining rounded openings that produce a precision quality finish and use a universal bit tool.

SUMMARY OF THE INVENTION

It is an advantage of the invention to provide a universal cutting bit and bit holder having the ability to rapidly and precisely machine a wide range of openings or recesses of varied shapes and/or profiles.

It is also an advantage of the invention to substantially reduce flexion of the cutting bit during machining.

It is another advantage of the invention to eliminate de-centering phenomena due to unbalanced radial efforts from flexion, and to eliminate concentricity defects resulting from cutting/machining effort.

Yet another advantage of the invention is to eliminate vibrations, chattering, and undulations to provide improved finish for the machined surface.

Still another advantage of the invention is to provide concentric machining for multiple contours within a opening.

Another advantage of the invention is to provide a precision cutting machine that can operate at high rotational speeds while compensating for the weight of its numerous moving parts.

Yet another advantage of the invention is to provide a precision cutting machine that can be adjusted to perform a variety and wide range of cutting operations needed to simultaneously form complex lines and shapes in a workpiece in a relatively efficient manner.

Yet another advantage of the invention is to permit a pilot of a cutting machine to be changed in an efficient manner.

Another advantage of the invention is to permit a pilot of a cutting machine to be aligned with a workpiece in an efficient manner.

Finally, an advantage of the invention is to determine the quality of a cutting operation with a particular bit tool.

In an exemplary embodiment, the invention is a line transfer system with a contour machining head for machining a workpiece. A line transfer system with a contour machining head comprises a driving system with a z-axis adjustable spindle, a depth gauge, a pilot, a contour machining head, and a system controller. The line transfer system with at least one contour machining head includes a spindle, a carriage head, a carriage head holder, a carriage feed driving assembly, and a universal cutting blade. A fixed pilot is attached to the bottom of the carriage head along the z-axis of a machine spindle to provide a means for centering the machining head in the opening to be machined, e.g., a valve guide of a cylinder head. The carriage head holder attaches to an extension of the machine spindle so that when the machine spindle is rotated, the machining head rotates. The carriage head is attached to the carriage head holder at an inclined angle relative to the bottom surface of the carriage head. The carriage feed driving assembly provides control of the inward and outward movement of the carriage head. The universal cutting blade is mounted on the carriage head through one of a plurality of mounting holes. For applications to cylinder head repair, the machining head can be utilized with virtually any conventional valve seat machining system, but is preferably used with the systems disclosed in U.S. Pat. Nos. 5,613,809, 5725,335, and 5,829, 928 of Harmand, et al. (hereinafter the '809, '335, and '928 patents, respectively) which are incorporated herein by reference.

The machining apparatus of the exemplary embodiment comprises a driving system, a machining head as described above, a pilot, a depth gauge, and a system controller. The driving system further comprises a machining sphere, a machine spindle, a spindle sheath, a rotational drive motor, and a vertical displacement motor. The spindle sheath is disposed within and supported by the machine sphere. The spindle sheath is fixed within the x- and y-axis, but can move along the z-axis by the vertical displacement motor. The vertical displacement motor is electrically connected and controlled by the system controller. The machine spindle is disposed within the spindle sheath and rotates around its z-axis through a drive motor. The drive motor rotating the machine spindle is electrically connected to and controlled by the system controller. The depth gauge is disposed on the spindle sheath by a fixed arm and is electrically connected to the system controller. The depth gauge measures the distance between a top surface of a cylinder head and the cutting blade. In a preferred embodiment, a second vertical displacement motor is provided so that feed of the arbor, which controls the carriage feed rate, is independent of the spindle feed which vertically moves the spindle, housing and all components therein relative to the working surface, providing three independent degrees of motion.

The system controller includes a memory which contains software for controlling the operation of the cutting tool. This system controller includes a user interface such as a touch screen at which an operator can input the parameters that define the geometry of, for example, a valve seat profile. These parameters are used by the system controller to determine the vertical feed rate of the contour machining head, the length of the vertical displacement of the contour machining head to machine the segment, the inward/outward displacement of the carriage head, and the number of rotations needed to machine a segment of the valve seat profile. The system controller uses a look-up table, stored externally or within internal memory, and the input information is used to determine the vertical feed rate of the machine spindle, the length of the vertical displacement of the spindle to machine the segment, and the number of rotations needed to machine a segment of the valve seat profile. An operator simply centers the spindle, activates the system after the initial input of information for a given cylinder head and valve seat profile, and re-centers on each subsequent valve seat before activation.

For applications to transfer machines or other machining applications, the system controller coordinates operation of the machining head with the transfer of work pieces into a work station associated with the machining head. As with the embodiment for use for valve seat machining, the controller stores data including the parameters used to control the machining head to achieve the desired characteristics (profile, diameter, depth, finish smoothness, etc.) of the opening. The data may be entered via a user interface located at a central controller within the transfer line, or may be located at the locating at which the machining is to occur.

At least three aspects of the invention relate to means for automating operation of the machines such as to allow operation with little or no human supervision and interaction.

A first aspect of the invention includes the use of robot arms for automated changing of tools such as pilots and reamers into the contour machining head.

A second aspect of the invention provides "intelligence" to the machine in a way that allows it to determine the amount of machining effort being exerted and making adjustments as needed.

Yet another aspect of the invention permits the machine to automatically insert the pilot in the valve guide or other guide hole by controlling movement in the horizontal plane and the approach angle.

The invention described herein provides a number of improvements to the "Contour Machining Head" disclosed in pending patent application Ser. No. 09/828,543, filed Apr. 6, 2001, published Aug. 30, 2001 as Publication No. U.S. 2001/0018012 A1, which is incorporated herein in its entirety by reference. The following improvements described and illustrated in the accompanying figures are not intended to be limited to use in conjunction with the "Contour Machining Head" described in the referenced application or with the commercial embodiment of that machine, sold under the names "Contour-1685" and "Contour Epoch" by Newen, Inc. of San Diego, Calif. Rather, the improvements may be incorporated in any similar machine. Furthermore, methods and processes described and illustrated in the accompanying specification may be sold under the names "Fixed Turning" and/or "Single Point Cutting".

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which:

FIG. 17 is a perspective view of a front view of the line transfer system with an arrangement of contour machining heads shown in FIG. 16.

DETAILED DESCRIPTION OF SPECIFIC EMBODIMENTS

The invention is a line transfer system with a contour machining head. The invention also includes a line transfer system with a plurality of contour machining heads. A contour machining head is dynamically balanced for rotation at relatively high speeds, and is configured to machine simple and/or complex lines, radii, concave or convex shapes, or any combination thereof in a workpiece. A workpiece is defined as any object to be machined, cut, or operated on by a contour machining head of a line transfer system. The line transfer system can also simultaneously machine one or more workpieces utilizing one or more contour machining heads. The line transfer system can include an apparatus for efficiently changing a pilot for centering or guiding the contour machining head with respect to a workpiece. Further, the line transfer system can include an apparatus for automatically guiding a pilot to a valve guide, guide bore, or other reference point with respect to a workpiece. Finally, the line transfer system can include an apparatus for determining the quality of a cutting operation with a particular bit tool. A bit tool can be a cutting tip, a machine tool, a drill, a brush, etc. Methods associated with the invention can machine a taper angle in a workpiece by utilizing a universal cutting blade and by simultaneously varying the height and cutting radius of the cutting blade. Cutting radius is defined as the distance from the bit tool to the rotational axis of the contour machining head. For example, a valve seat taper angle can be described by varying only the rotational axis feed rate of the contour machining head when the spindle rotation varies the cutting radius of the bit tool through a gearing system. Alternatively, a valve seat taper angle can be machined by varying only the rotational speed of the contour machining head while the rotational axis feed rate of the contour machining head remains constant. Another method of machining a taper angle in a workpiece is to utilize a rotational axis feed rate of the bit tool, a contour machining head rotation to rotate the bit tool, and a means to vary the cutting radius that is independent of contour machining head rotation.

Figure 1:
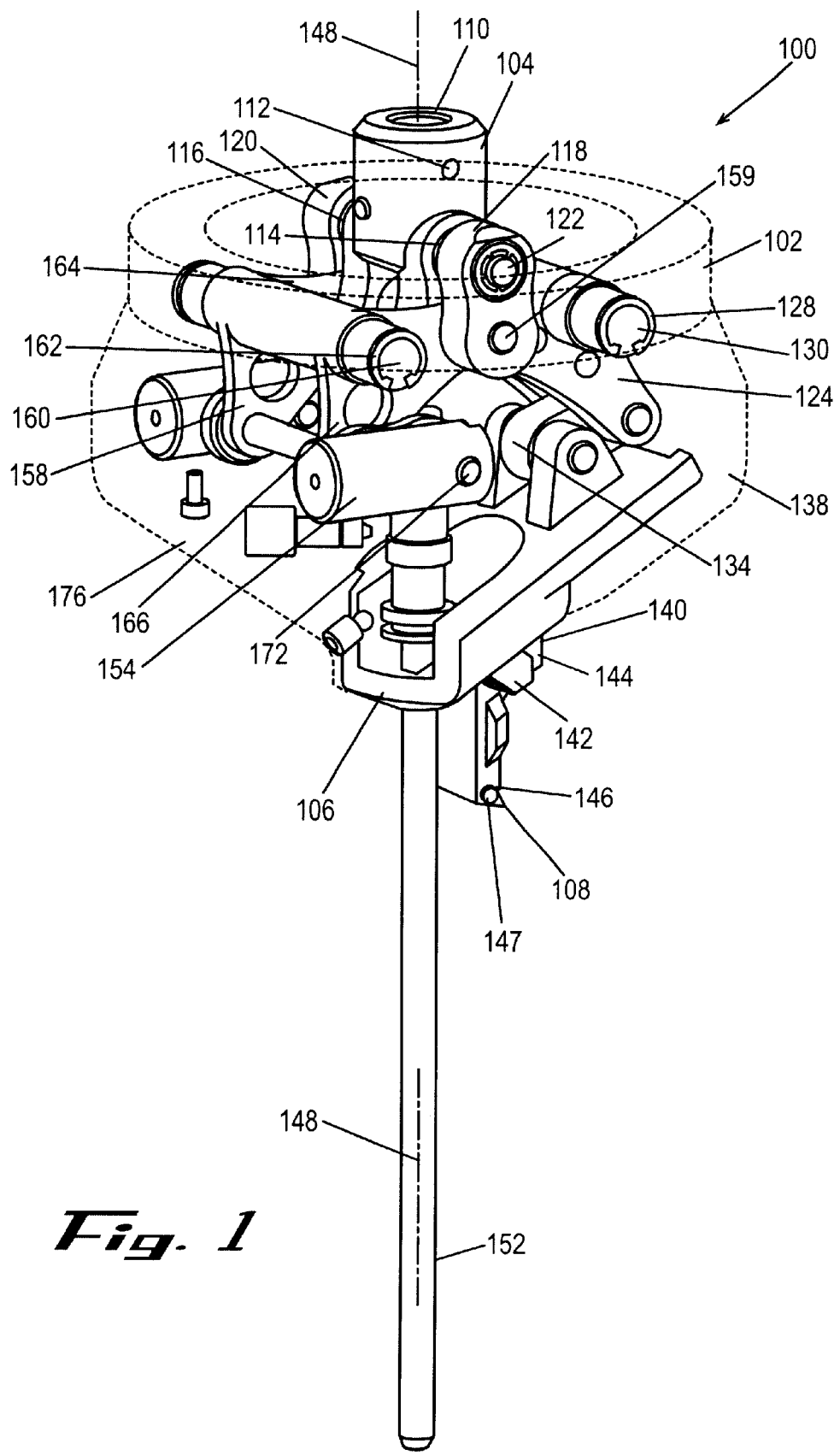
FIG. 1 is a perspective side view of a first embodiment of a contour machining head in accordance with the invention.
Figure 2:
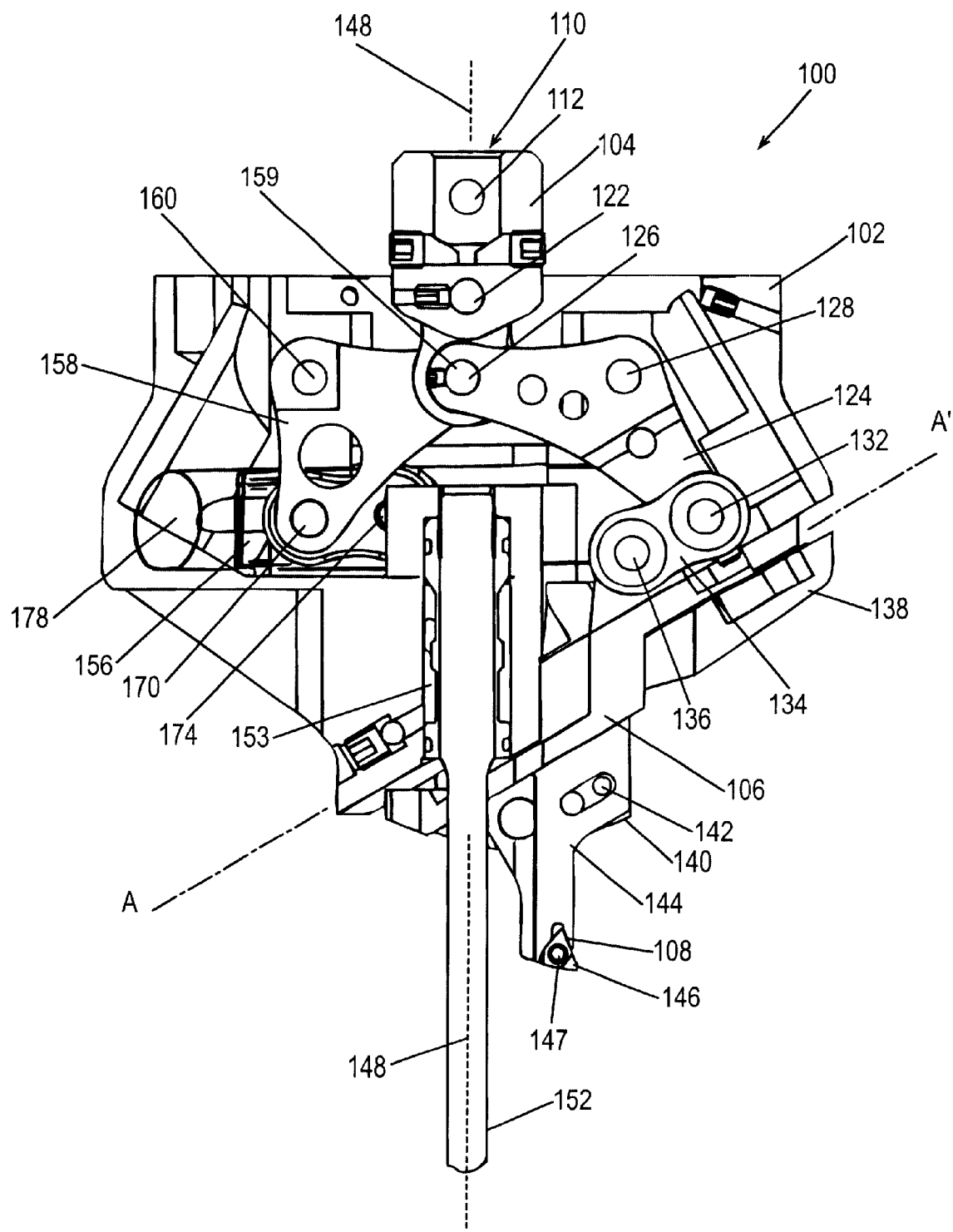
FIG. 2 is a diagrammatic front view of the contour machining head shown in FIG. 1.
Figure 3:
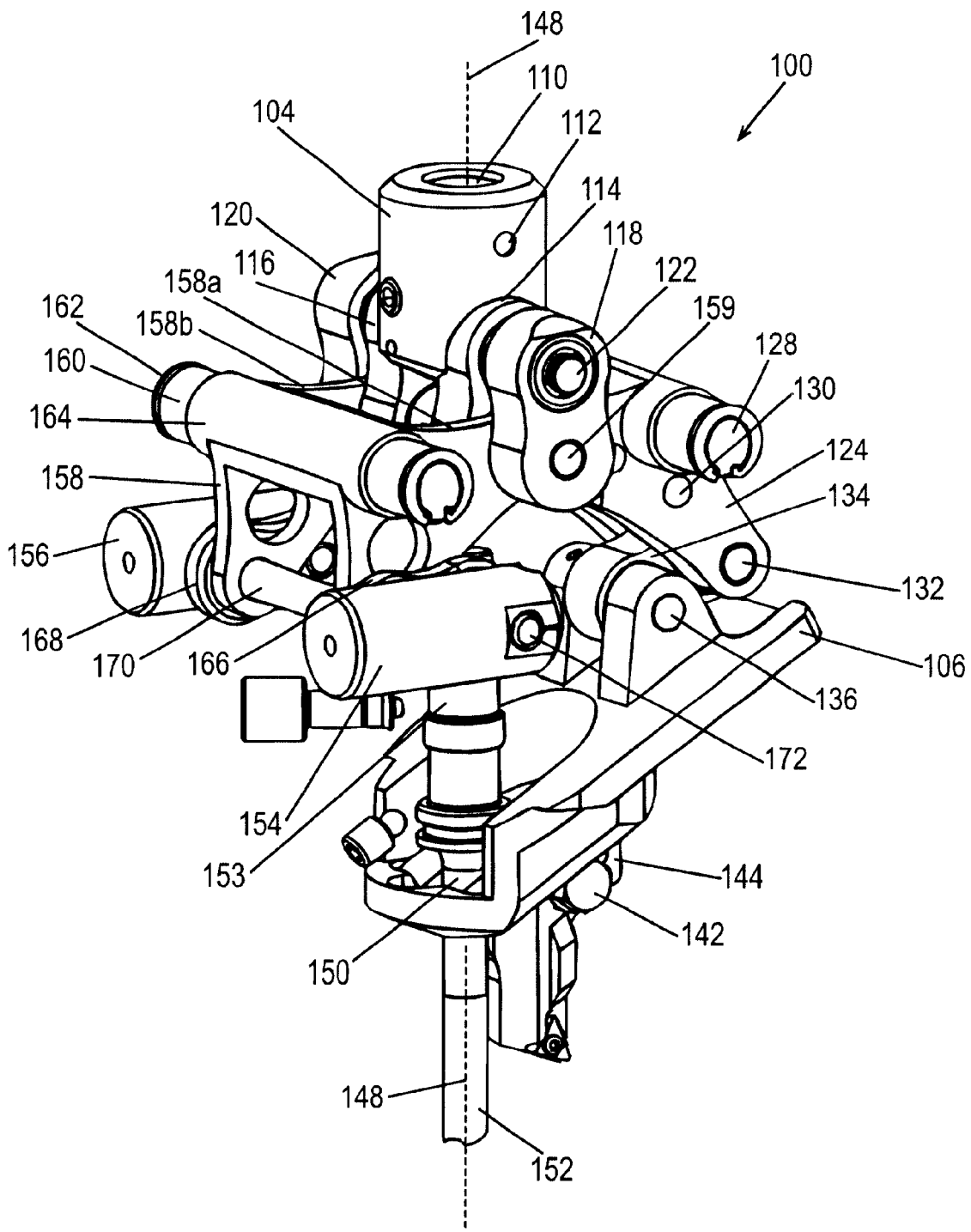
FIG. 3 is a perspective view, partially cut away, of the contour machining head shown in FIGS. 1 and 2.

FIGS. 1–12 illustrate embodiments of a contour machining head that can be used with the invention. Other embodiments of a contour machining head can be used with the invention, such as those disclosed in related U.S. application Ser. No. 09/828,543, filed Apr. 6, 2001. FIGS. 1–3 illustrate a first embodiment of a contour machining head 100 for a line transfer system in accordance with the invention. The contour machining head 100 is dynamically balanced and capable of operation which is play-free with zero backlash for optimum precision and near-perfect machining qualities. Such precision cannot be achieved using a transmission with pinions, endless screws, racks, etc. of conventional machining heads. The dynamic balance and lack of play allows a bit tool to be moved inward or outward during operation at will, so that concave profiles, convex profiles, or any combination thereof can be machined. Counterweights are used to maintain the dynamic balance of the rotating contour machining head 100 to such a level of precision that speeds of 3000 rpm or higher can be attained during machining.

Typically, a contour machining head 100 is mounted to a machining spindle with an appropriate machining head support, and rotated by a driving system. An exemplary machining spindle, machining head support, and driving system that can be used with a contour machining head 100 are shown and disclosed in related U.S. application Ser. No. 09/828,543, filed Apr. 6, 2001. In certain machining applications, the contour machining head 100 may be mounted in various configurations of a machining head support such as a spherical housing, or similar type of housing that permits angular displacement of the contour machining head 100 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

Referring to FIGS. 1–3, which are a perspective side view, a diagrammatic front view, and a partially cut away perspective view of the first embodiment of a contour machining head 100, respectively, the contour machining head 100 can be inserted into a machining spindle (not shown) with an appropriate machining head support (not shown). For example, in applications such as valve seat machining, a machining head support can be a housing such as spherical housing, or a similar mounting which permits angular displacement of contour machining head 100 at angles needed to access the valve seats. For other applications, such as transfer machines, a similar mounting to the spherical housing, for angular displacement, or a fixed mounting that permits up and down movement and possibly movement in the x-y plane. Selection of an appropriate machining head support for the desired application will be apparent to one of skill in the art.

The contour machining head 100 includes an upper portion of housing 102 that mounts to a spindle (not shown) using screws or other appropriate fasteners (not shown). To enhance rigidity of the connection, and to ensure proper centering, a combination of flange and tapered annular ring in the spindle may mate with corresponding features formed in housing 102. A flange may abut the upper planar surface of housing 102, while a tapered ring may fit closely within the inner diameter of housing 102.

An arbor cap 104 connects to a distal end of a transmission arbor (not shown) extending concentrically from the spindle. The transmission arbor is typically driven by a rotational drive motor, and with a combination of associated bearings and pinions may drive the arbor cap 104 in a rotational direction. An exemplary transmission arbor, rotational drive motor, and associated bearings and pinions that can be used with a contour machining head 100 are shown and described in related U.S. application Ser. No. 09/828, 543, filed Apr. 6, 2001.

A second degree of motion is accomplished by an axial drive motor or other drive means (not shown). The arbor cap 104 connects to the distal end of a transmission arbor which is connected at its proximal end to an axial drive motor or other drive means for effecting axial movement of the arbor cap 104. Axial movement of the arbor cap 104 provides radial movement or feed of a carriage 106 along carriage line A–A'. With this configuration, the contour machining head 100 is capable of working in both directions, forward and backward. The separate controls for feed and rotation allow the rate of radial travel of the bit tool to be varied during operation as needed, independent of rotation, permitting rapid variation in cutting diameter to create different profiles in a workpiece. An exemplary axial drive motor that can be used with a contour machining head 100 is shown and described in related U.S. application Ser. No. 09/828,543, filed Apr. 6, 2001.

A third degree of motion is accomplished by another motor (not shown) which drives axial feed and retraction of the spindle and its sheath, independent of the carriage feed described above. This function provides fine adjustment of the height of the contour machining head 100 and bit tool 108 over the workpiece and controls cutting depth, including feeding the bit tool 108 during rotation to achieve the desired depth. An exemplary motor for fine adjustment that can be used with a contour machining head 100 is shown and described in related U.S. application Ser. No. 09/828,543, filed Apr. 6, 2001.

As shown in FIGS. 1–3, the arbor cap 104 has an opening 110 that can receive a distal end of a transmission arbor. When the distal end of a transmission arbor is inserted into the opening of cap 104, a set screw (not shown) is inserted through a radial bore 112 in the arbor cap 104 to secure the connection between transmission arbor and arbor cap 104. An optional collar (not shown) may be placed within the inner diameter of housing 102 with a flange portion partially encircling the arbor cap 104. The flange portion provides additional stability to the arbor cap 104 to further ensure centering. Openings through the optional collar permit connecting rods 114, 116, 118, 120 to extend above the radially-extending face of the optional collar.

At the lower end of the arbor cap 104, a bore extends through the cap's full diameter. The bore retains an axle 122 with the ends of the axle 122 extending beyond the outer diameter of the arbor cap 104. Connecting rods 114, 116, 118, 120 pivotally connect at their first ends to the axle 122, with connecting rods 114, 118 on one side of the arbor cap 104 and connecting rods 116, 120 on the opposite side, as shown in FIGS. 1 and 3. Connecting rods 114, 116 pivotally connect at their second ends to a first end of a cantilever 124 via axle 126. As illustrated in FIGS. 1 and 3, cantilever 124 is a forked structure, with one arm at its first end adjacent to axle 126 and two arms at its opposing second end. This configuration is selected for ease of manufacture and assembly. Other variations will be apparent to those of skill in the art, including one or two one-arm cantilevers. Cantilever 124 pivotally mounts on a cantilever axle 128 which connects in a fixed position to the interior of housing 102. Axle fastener 130, secures the cantilever 124 on the cantilever axle 128. The second end of cantilever 124 pivotally connects via axle 132 to the first end of connecting rod 134. The second end of connecting rod 134 pivotally connects via axle 136 to the carriage 106.

The carriage 106 has a pair of upward extension tabs through which axle 136 passes to provide connection to connecting rod 134. Carriage 106 slides radially along carriage line A–A' and partially within contour machining head 100 on carriage guide 138, which can be formed integrally within housing 102 or attached as separate components, as shown in FIGS. 1 and 2. The carriage guide 138 has rails (not shown) formed on opposite sides of a central portion opening (not shown). The spacing of the opening is adapted to closely fit an outer width of the carriage 106 so that the carriage 106 will slide with minimal resistance along the lengths of rails. Carriage tab 140 extends downward from carriage 106. A threaded bore through carriage tab 140 is adapted to receive locking screw 142 which is used to attach bit mount 144 from which a bit 146 and associated bit tool 108 extends. In the preferred embodiment, bit tool 108 such as a cutting tip is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape of the bit tool 108 fits closely within a recess formed in the distal end of bit mount 144 to prevent movement of bit tool 108 relative to bit mount 144. For attachment of a new bit 146, locking screw 147 is inserted through a slot in bit mount 144. Bit mount 144 is positioned along the carriage 106 by positioning the bit mount 144 relative to the locking screw 142, after which locking screw 142 is tightened to fix the bit mount 144 in place. Note that the slot can be open or closed at the end as shown in FIGS. 1 and 2. The upper edge of bit mount 144 should abut the bottom surface of carriage 106 for good stability.

As illustrated in FIGS. 1 and 2, carriage 106 is slidably disposed within carriage guide 138 which connects to the lower portion of housing 102 via a plurality of screws or other fasteners (not shown). An upward motion of the transmission arbor (not shown) pulls the arbor cap 104 upward which, through the linkage provided by connecting rods 114, 116 lifts the first end of cantilever 124. Cantilever 124 pivots on fixed axle 130 causing the second end of cantilever 124 to swing inward along carriage line A–A', toward a central axis 148 of the contour machining head 100. This motion pushes connecting rod 134 toward the central axis 148 which, through its connection via axle 136 forces carriage 106 to move towards the center axis 148 along the carriage guide 138, moving cutting bit 108 radially inward, decreasing the cutting diameter. Through the same series of linkages, a downward motion of the transmission arbor causes the carriage 106 to slide outward away from the central axis 148 along carriage line A–A', increasing the cutting diameter. An elongated slot 150 is formed in carriage 106 to allow a pilot 152 to pass through without contacting the carriage 106, regardless of the position of the carriage 106.

The pilot 152 permits the contour machining head 100 to locate and maintain a fixed position with respect to the workpiece upon which the bit tool 108 is to be applied. For example, the pilot 152 permits centering of the contour machining head 100 within an opening in a workpiece to be cut. For engine cylinder head applications, pilot 152 may be inserted into a valve guide which is centered on a valve seat. For other applications, such as manufacturing, the pilot 152 may be omitted, or a pre-drilled pilot hole will preferably be provided to guide the contour machining head 100 for centering. Pilot 152 is typically held within a corresponding pilot socket in the housing 102. A hydraulic clamp 153 (also referred to as a "hydraulic sleeve") is placed inside the corresponding pilot socket. Clamp 153 is activated by turning one or more screws or knobs which extend into an associated oil reservoir (not shown). Displacement by the screws forces oil from reservoir into the clamp 153 causing its inner diameter to contract, coaxially locking the pilot 152 so that it is held rigidly and concentrically with respect to the contour machining head 100.

In an exemplary embodiment, the lower portion of housing 102 is configured with an approximate 30 degree angle with respect to horizontal so that carriage 106 is also disposed at an approximate 30 degree angle. This angle is particularly suited for applications to engine cylinder head machining since it is the general direction of the profile of valve seats, which are usually between 30 to 45 degrees relative to horizontal. For other applications, such as in a line transfer system, the housing 102 should be configured to hold the carriage 106 at an angle within the range of the workpiece or workpieces to be machined. In some cases, this angle may be 0 degrees, i.e., parallel to the work surface. Generally, the closer the angle of the carriage 106 to that of the workpiece surface to be machined, the better the surface finish, due to the reduced speed of the motor controlling the vertical feed/retraction of transmission arbor. In some instances when the entire contour machining head 100 must be tilted at an angle to make the carriage angle match the workpiece angle, the range of diameters that can be machined may be reduced. The steeper the angle, the greater the range reduction. Therefore, it is preferable to position the carriage angle to match the angle of the workpiece, so that the remaining portions of the contour machining head 100 is not tilted. However, the greater the carriage angle with the contour machining head 100 in a normal, non-tilted position, the greater the pressure on the driving pinions, which can result in increased wear. Therefore, a balance should be established when selecting the appropriate carriage angle.

Since the contour machining head 100 typically operates at a relatively high rotational speed, from 1000 rpm or higher, radial offset of the carriage 106 should be dynamically counterbalanced to maintain centering around the central axis 152 of the contour machining head 100. Counterbalancing of the contour machining head 100 is provided by an associated counterweight assembly 154–178 shown in FIGS. 1–3.

Counterweights 154, 156 associated with the counterweighting assembly move in a direction opposite to that of the carriage 106. The mass of the counterweights 154, 156 is selected to compensate exactly for the variation of the position of the center of gravity of the contour machining head 100 when the carriage 106 is moving. The force "F" that must be applied to the transmission arbor to move carriage 106 is equal to $$F = A + C + (M1 + M2) w^2 KR,$$

where
- A=force resulting from friction;
- C=force due to resistance of the material being machined;
- M1=carriage mass;
- M2=counterweight mass;
- w=rotational speed;
- K=proportionality constant
- R=radius of center of gravity of the carriage and counterweights.

The higher the rotational speed and the larger the radius of the workpiece surface to be machined, the more important F becomes. Therefore, the carriage mass should be minimized as much as possible. Generally, materials having the smallest mass:rigidity ratio should be selected. Materials that fall within this criteria include aluminum alloys, other metal alloys, ceramics, and composite materials. In the preferred embodiment, the material of which the components of contour head 100 are made is a steel alloy (35NCD16) commonly used for quality tool manufacturing. The parts are preferably vacuum treated. Carriage 106 is coated with a 4500 Hv. carbon-diamond coating to resist wear.

Returning to the counterweight assembly 154–178 shown in FIGS. 1–3, connecting rods 118, 120, connected to arbor cap 104 at axle 122, transfer force from the arbor cap 104 to cantilever 158. Cantilever 158 connects at its first end to connecting rods 118, 120 via axle 159 and pivots on fixed cantilever axle 160 which in turn connects to housing 102. Cantilever 158 is secured to fixed cantilever axle 160 by axle fastener 162. As shown in FIG. 3, cantilever 158 is configured with two separate cantilever arms (158a and 158b) linked by a fixed sleeve 164 concentric with the fixed cantilever axle 160, so that both arms 158a, 158b can rotate together. While the formation of the two cantilever arms 158a, 158b and axle sleeve 164 as a unit ensures simultaneous movement, separate arms may be used as long as they are rigidly joined together so that both move at the same time. The second ends of cantilever 158 connect respectively to connecting rods 166, 168 via axle 170. The second end of each connecting rod 166, 168 respectively connects to counterweights 154, 156 via axles 172, 174, respectively. Counterweights 154, 156 are slidably disposed within counterweight guides 176, 178, respectively, which are disposed at equal distances from the central axis 152 of rotation of the contour machining head 100 to ensure proper balance in all directions. It may be necessary to fine tune the counterweights 154, 156 to optimize balance relative to the carriage 106 and associated carriage parts. In one embodiment, a pin can extend from the counterweights 154, 156 to allow placement of small annular weights, which can be stacked over pin to slightly increase the weight as needed for dynamic counterbalancing. Alternatively, small weights can be added by directly attaching them to the counterweights 154, 156 using small screws which are inserted into a threaded bore in each counterweight 154, 156. The threaded bore may be formed to extend coaxially into the counterweight as illustrated in FIG. 3. The screws can be used to add one or more small washers to provide additional weight to each counterweight 154, 156.

When the transmission arbor (not shown) is moved upward, the arbor cap 104 pulls connecting rods 118, 120 upward, which in turn pull up on the first ends of cantilever 158. This movement causes the cantilever 158 to pivot on fixed cantilever axle 160, and the second end of the cantilever 158 moves towards the central axis 152 of the contour machining head 100. Through the connection provided by connecting rods 166, 168, and axles 160, 170, 172, counterweights 154, 156 are forced inward, toward the central axis 152. Thus, the movement of the transmission arbor causes both the carriage 106 and counterweights 154, 156 to move, so that with an upward movement of transmission arbor, both the carriage 106 and counterweights 154, 156 move radially inward towards the central axis 152 to maintain dynamic balancing around the rotational center.

Alternatively, when the transmission arbor (not shown) moves downward, both the carriage 106 and counterweights 154, 156 move radially outward away from the central axis 152. The combination of the carriage 106 and counterweight assembly 154–178 permit the contour machining head 100 to be used for either radial outward or radial inward cutting.

In order to maintain the needed displacement ratio for maintaining dynamic counterbalancing through the entire travel of the transmission arbor and carriage 106, geometric relationships as disclosed in related U.S. application Ser. No. 09/828,543, filed Apr. 6, 2001 must be preserved. Angle A1, of connecting rods 114, 116 relative to the rotational axis or central axis 154 must be equal to angle A2, between connecting rod 134 and carriage 106. Angle A3 between connecting rods 114, 116 and the first portion of cantilever 124 must be equal, to angle A4, between the second portion of cantilever 124 and connecting rod 134. The connecting rods 114, 116, 134 must have the same length ratio as the two portions (arms) of cantilever 124 in order to maintain the angle equivalencies.

Alternate configurations of counterbalancing and other embodiments for linkages can be utilized with the invention, such as eliminating the connecting rods and replacing them with a combination of bearings and grooves as shown and described in related U.S. application Ser. No. 09/828,543, filed Apr. 6, 2001.

Figure 4:
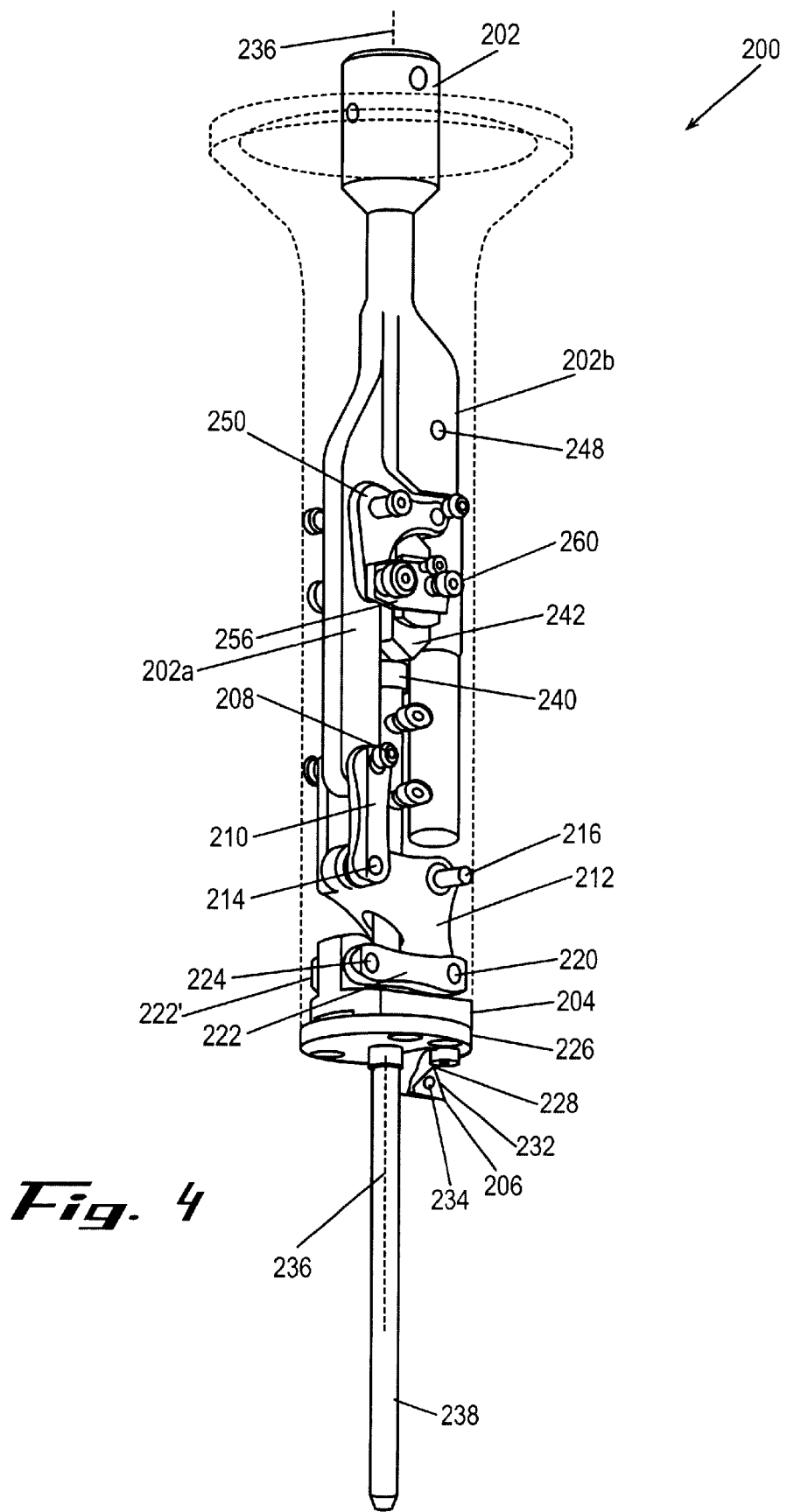
FIG. 4 is a perspective view of a second embodiment of a contour machining head in accordance with the invention.
Figure 5:
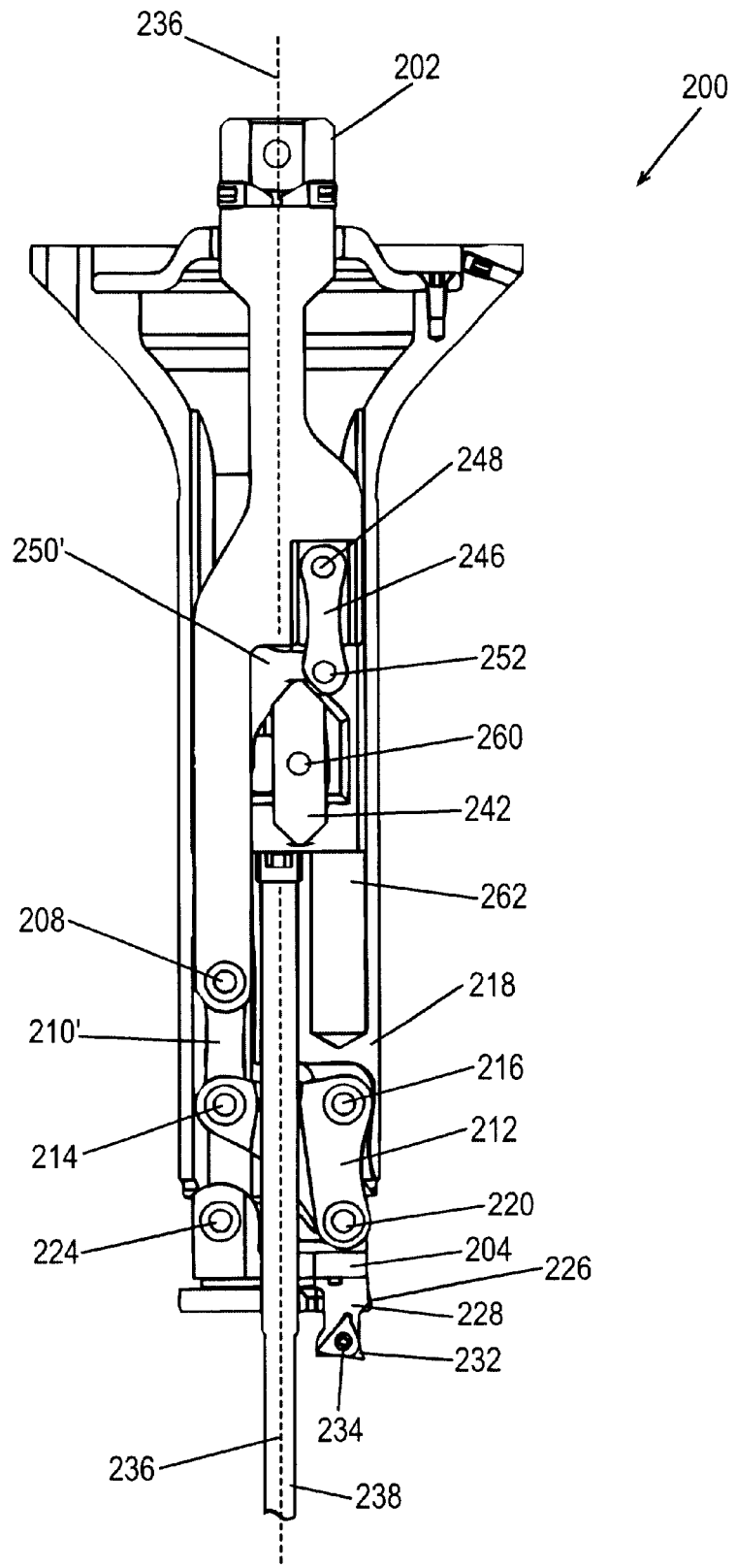
FIG. 5 is a diagrammatic front view of the contour machining head shown in FIG. 4.
Figure 6:
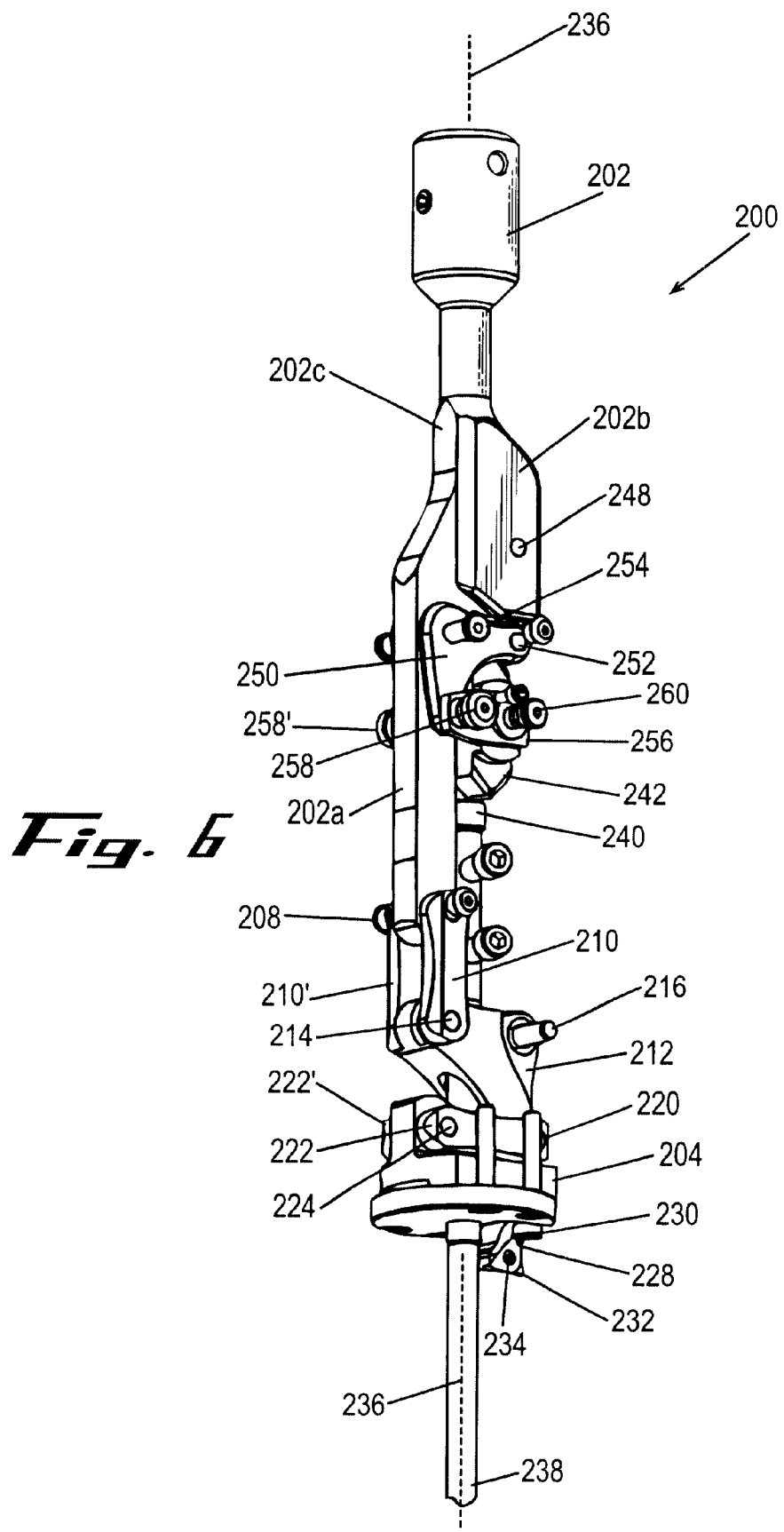
FIG. 6 is a perspective side view, partially cut away, of the contour machining head shown in FIGS. 4 and 5.

FIGS. 4–6 illustrate a second embodiment of a contour machining head 200 for a line transfer system in accordance with the invention. The second embodiment is particularly adapted to machining small diameter openings in locations where access must be obtained through deep and/or narrow cavities or channels. Similar to the first embodiment, the contour machining head 200 is dynamically balanced and capable of operation which is play-free with zero backlash for optimum precision and near-perfect machining qualities. Counterweights are used to maintain the dynamic balance of the contour machining head 200 to such a level of precision that relatively high rotational speeds of 1000 rpm or higher can be attained during machining. A contour machining head 200 is mounted to a machining spindle (not shown) and rotated by a driving system (not shown). The contour machining head 200 may be mounted in various configurations of a machining spindle with an associated machining head support such as a spherical housing, or similar type of housing that permits angular displacement of the contour machining head 200 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

Referring to FIGS. 4–6, which are a perspective side view, a diagrammatic front view, and a partially cut away perspective view of the second embodiment of a contour machining head 200, respectively, the contour machining head 200 receives a transmission arbor (not shown). The contour machining head 200 includes an arbor cap 202 that has a corresponding opening configured to receive a transmission arbor. The arbor cap 202 and transmission arbor are connected to each other using a set screw or other appropriate fasteners (not shown). Typically, the transmission arbor is housed within a machining spindle (not shown) that is rotated by a driving system (not shown), which in turn provides a rotational force to the contour machining head 200. The contour machining head 200 may be mounted in various configurations of a machining spindle with an associated machining head support such as a spherical housing, or similar type of housing that permits angular displacement of the contour machining head 200 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

The transmission arbor is typically driven by a rotational drive motor, and with a combination of associated bearings and pinions may drive the arbor cap 202 in a rotational direction. An exemplary transmission arbor, rotational drive motor, and associated bearings and pinions that can be used with a contour machining head 200 are shown and described in related U.S. application Ser. No. 09/828,543, filed Apr. 6, 2001.

A second degree of motion is accomplished by an axial drive motor or other drive means (not shown). The arbor cap 202 connects to the distal end of a transmission arbor which is connected at its proximal end to an axial drive motor or other drive means for effecting axial movement of the arbor cap 202. Axial movement of the arbor cap 202 provides radial movement or feed of a carriage 204. With this configuration, the contour machining head 200 is capable of working in both directions, forward and backward. The separate controls for feed and rotation allow the rate of radial travel of the bit tool to be varied during operation as needed, independent of rotation, permitting rapid variation in cutting diameter to create different profiles in a workpiece. An exemplary axial drive motor that can be used with a contour machining head 200 is shown and described in related U.S. application Ser. No. 09/828,543, filed Apr. 6, 2001.

A third degree of motion is accomplished by another motor (not shown) which drives axial feed and retraction of the spindle and its sheath, independent of the carriage feed described above. This function provides fine adjustment of the height of the contour machining head 200 and bit tool 206 over the workpiece and controls cutting depth, including feeding the bit tool 206 during rotation to achieve the desired depth. An exemplary motor for fine adjustment that can be used with a contour machining head 200 is shown and described in related U.S. application Ser. No. 09/828,543, filed Apr. 6, 2001.

As shown in FIGS. 4–6, the arbor cap 202 can receive a distal end of a transmission arbor (not shown). The arbor cap 202 has an elongate shape with a lower arm 202a and a pair of central protrusions 202b, 202c. A bore through the lower arm 202a retains an axle 208 with the ends of the axle 208 extending beyond the edges of the lower arm 202a. Connecting rods 210, 210' pivotally connect at their first end to the axle 208, with the first ends of the connecting rods 210, 210' positioned on opposing sides of the lower arm 202a, as shown in FIG. 6. Connecting rods 210, 210' pivotally connect at their second ends to a first end of a cantilever 212 via axle 214. As illustrated in FIGS. 4–6, cantilever 212 is a triangular-shaped structure, with one arm at its first end adjacent to axle 214 and one arm at its opposing second end. This configuration is selected for ease of manufacture and assembly. Other variations will be apparent to those of skill in the art, including one or two one-arm cantilevers. Cantilever 212 pivotally mounts on a cantilever axle 216 which connects in a fixed position to the interior of housing 218. The second end of cantilever 212 pivotally connects via axle 220 to the first end of a pair of connecting rods 222, 222'. The second ends of connecting rods 222, 222' pivotally connect via axle 224 to the carriage 204.

Figure 7:
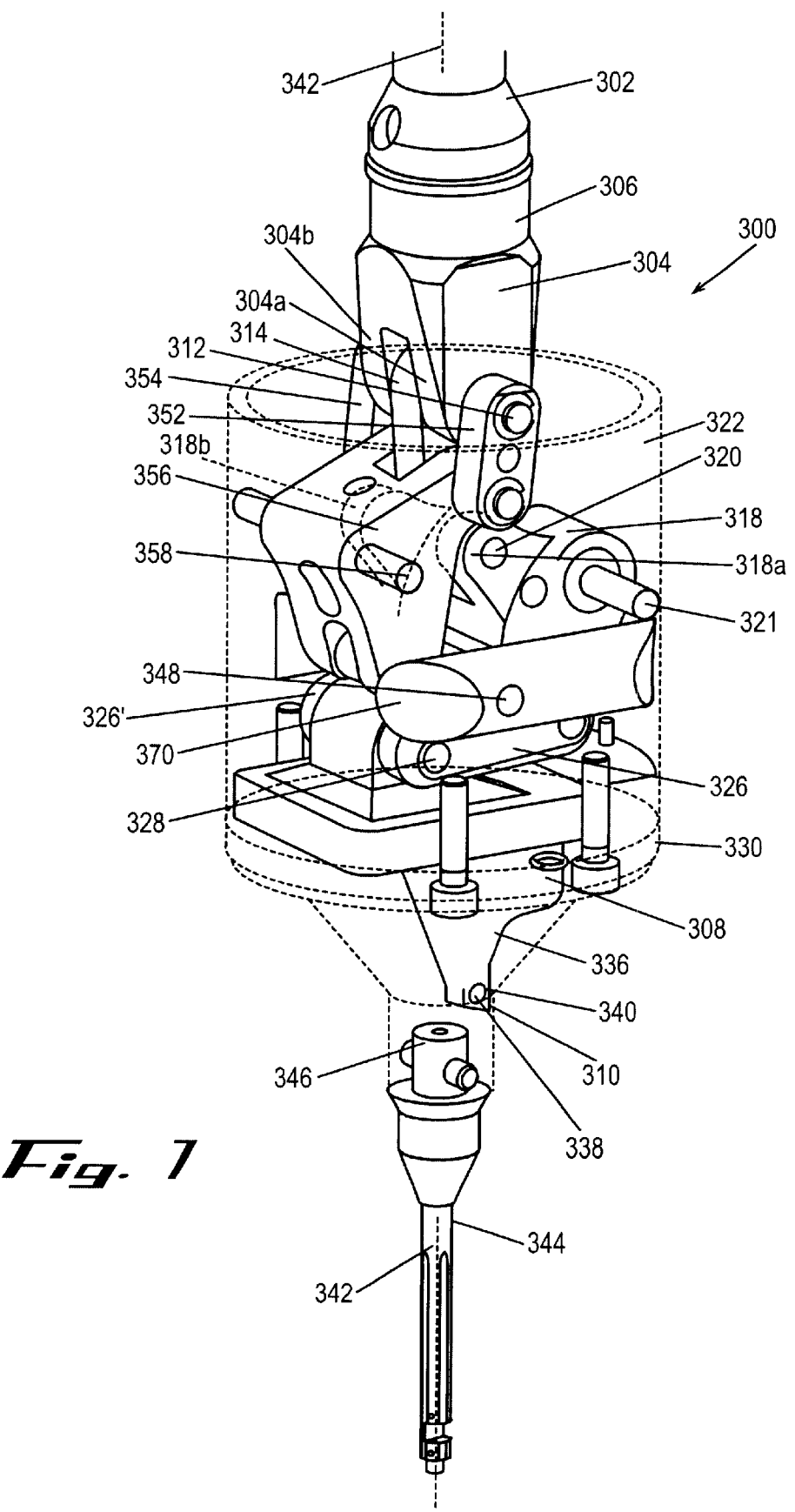
FIG. 7 is a perspective view of a third embodiment of a contour machining head in accordance with the invention.
Figure 8:
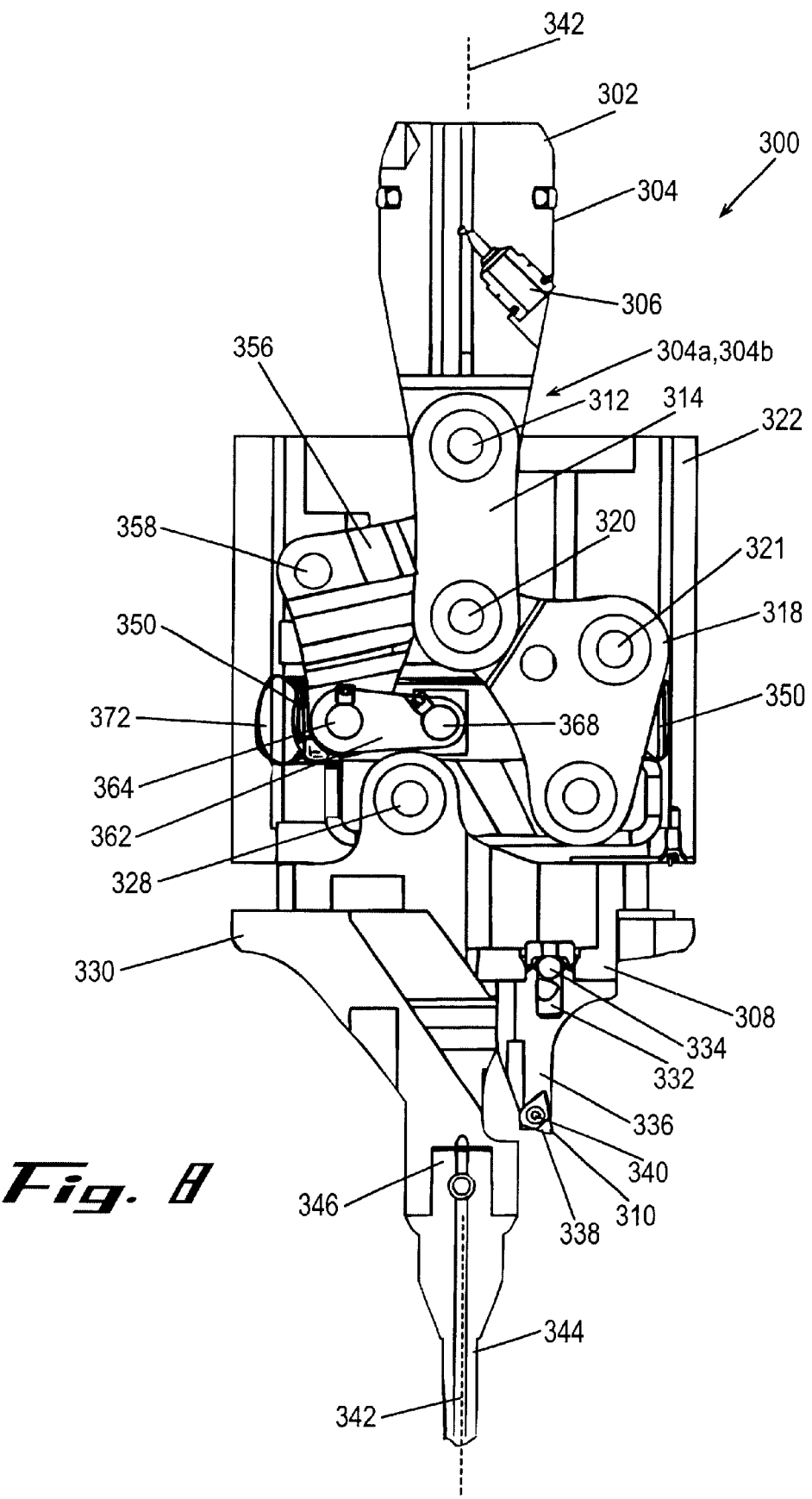
FIG. 8 is a diagrammatic front view of a contour machining head shown in FIG. 7.
Figure 9:
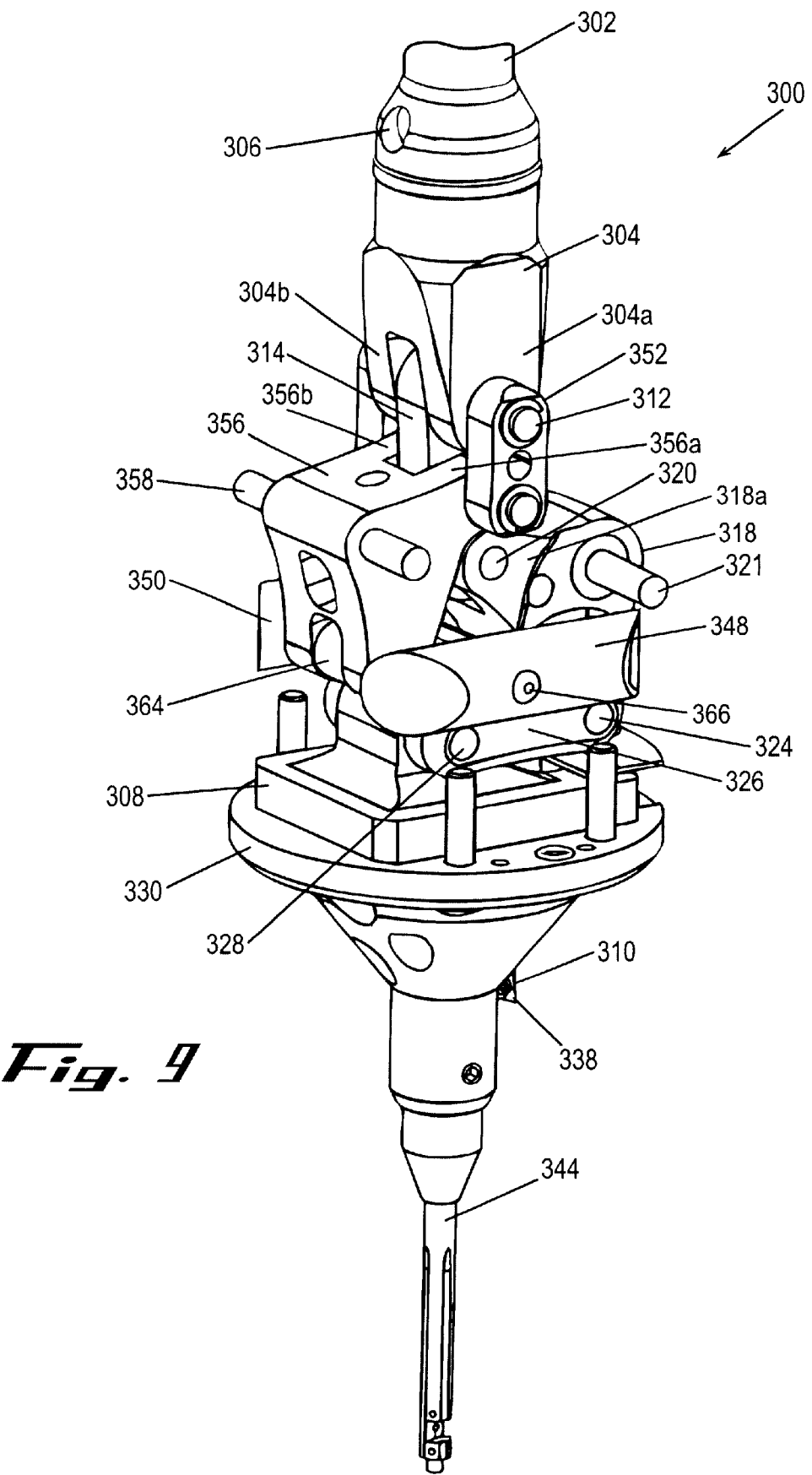
FIG. 9 is a perspective side view, partially cut away, of the contour machining head shown in FIGS. 7 and 8.

The carriage 204 has an upward extension tab through which axle 224 passes to provide connection to connecting rods 222, 222'. Carriage 204 slides radially within contour machining head 200 on carriage guide 226, which can be formed integrally within housing 218 or attached as a separate component, as shown in FIGS. 7–9. The carriage guide 226 has rails (not shown) formed on opposite sides of a central portion opening (not shown). The spacing of the opening is adapted to closely fit an outer width of the carriage 204 so that the carriage 204 will slide with minimal resistance along the lengths of rails. Bit mount 228 extends downward from carriage 204. A threaded bore through bit mount 228 is adapted to receive locking screw 230 which is used to connect bit mount 228 from which a bit 232 and associated bit tool 206 extends. As previously described, the bit tool 206 such as a cutting tip is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape of the bit tool 206 fits closely within a recess formed in the distal end of bit mount 228 to prevent movement of bit tool 206 relative to bit mount 228. For attachment of a new bit 232, locking screw 234 is inserted through a slot in bit mount 228. Bit mount 228 is positioned along the carriage 204 by positioning the bit mount 228 relative to the locking screw 230, after which locking screw 230 is tightened to fix the bit mount 228 in place. The upper edge of bit mount 228 should abut the bottom surface of carriage 204 for good stability.

As illustrated in FIGS. 4–6, carriage 204 is slidably disposed within carriage guide 226 which connects to the lower portion of housing 218 via a plurality of screws or other fasteners (not shown). An upward motion of the transmission arbor (not shown) pulls the arbor cap 202 upward which, through the linkage provided by connecting rods 210, 210' lifts the first end of cantilever 212. Cantilever 212 pivots on fixed axle 216 causing the second end of cantilever 212 to swing inward toward a central axis 236 of the contour machining head 200. This motion pushes connecting rods 222, 222' against the carriage 204, and through its connection via axle 224 forces carriage 204 to move along the carriage guide 226, moving cutting bit 208 radially inward, decreasing the cutting diameter. Through the same series of linkages, a downward motion of the transmission arbor causes the carriage 204 to slide outward away from the central axis 236, increasing the cutting diameter.

The carriage guide 226 or lower portion of the housing 218 includes a pilot 238 that extends downward away from the carriage 204 and along the central axis 236. The pilot 238 permits the contour machining head 200 to locate and maintain a fixed position with respect to the workpiece upon which the bit tool 206 is to be applied. For example, the pilot 238 permits centering of the contour machining head 200 within an opening in a workpiece to be cut. For engine cylinder head applications, pilot 238 may be inserted into a valve guide which is centered on a valve seat. For other applications, such as manufacturing, the pilot 238 may be omitted, or a pre-drilled pilot hole will preferably be provided to guide the contour machining head 200 for centering. Pilot 238 is typically held within a corresponding pilot socket in the carriage guide 226 or lower portion of the housing 218. A hydraulic clamp 240 is placed inside the corresponding pilot socket. Clamp 240 activated by turning one or more screws or knobs which extend into an associated oil reservoir (not shown). Displacement by the screws forces oil from reservoir into the clamp 240, coaxially locking the pilot 238 so that it is held rigidly and concentrically with respect to the contour machining head 200.

Since the contour machining head 200 typically operates at a relatively high rotational speed, from 1000 rpm or higher, radial offset of the carriage 204 should be dynamically counterbalanced to maintain centering around the central axis 236 of the contour machining head 200. Counterbalancing of the contour machining head 200 is provided by an associated counterweight assembly 242–262 shown in FIGS. 4–6.

Counterweight 242 associated with the counterweighting assembly moves in a direction opposite to that of the carriage 204. The mass of the counterweight 242 (and 244?) is selected to compensate exactly for the variation of the position of the center of gravity of the contour machining head 200 when the carriage 204 is moving.

Connecting rods 246, 246', connected to the central protrusions 202b, 202c of the arbor cap 202 at shared axle 248, transfer force from the arbor cap 202 to cantilevers 250, 250'. Cantilevers 250, 250' respectively connect at their first end to connecting rods 246, 246' via shared axle 252 and pivot on fixed cantilever axle 254 which in turn connects to housing 218. As shown in FIG. 5, cantilevers 250, 250' are configured with an upper cantilever arm and with a lower cantilever arms at a second end. The second end of each cantilever 250, 250' connects respectively to connecting rods 256, 256' via respective axles 258, 258'. The second ends of connecting rods 256, 256' both connect to counterweight 242 via axle 260. Counterweight 242 is slidably disposed within a counterweight guide 262 which is disposed adjacent to the central axis 236 of rotation of the contour machining head 200 to ensure proper balance in all directions. It may be necessary to fine tune the counterweight 242 to optimize balance relative to the carriage 204 and associated carriage parts. In one embodiment, a pin can extend from the counterweight 242 to allow placement of small annular weights, which can be stacked over the pin to slightly increase the weight as needed for dynamic counterbalancing. Alternatively, small weights can be added by directly attaching them to the counterweight 242 using small screws which are inserted into a threaded bore in the counterweight 242. The screws can be used to add one or more small washers to provide additional weight to the counterweight 242.

When the transmission arbor (not shown) is moved upward, the arbor cap 202 pulls connecting rods 210, 210' upward, which in turn pull up on the first end of cantilever 212. This movement causes the cantilever 212 to pivot on fixed cantilever axle 216, and the second end of the cantilever 212 moves towards the central axis 236 of the contour machining head 200. Through the connection provided by connecting rods 222, 222' and axles 220, 224, the carriage 204 moves inward and the bit tool moves towards the central axis 236. Simultaneously, the upward force on the arbor cap 202 causes the cantilever 250 to pivot on fixed cantilever axle 254, and the second end of the cantilever 250 moves towards the central axis 236 of the contour machining head 200. Through the connection provided by connecting rods 256, 256' and axles 258, 258', the counterweight 242 moves inward. Thus, the upward movement of the transmission arbor causes both the carriage 204 and counterweight 242 to move, so that with an upward movement of transmission arbor, both the carriage 204 and counterweight 242 moves radially inward to maintain dynamic balancing around the rotational center.

Alternatively, when the transmission arbor moves downward, both the carriage 204 and counterweight 242 move radially outward. The combination of the carriage 204 and counterweight assembly 242–262 permit the contour machining head 200 to be used for either radial outward or radial inward cutting.

FIGS. 7–9 illustrate a third embodiment of a contour machining head 300 for a line transfer system in accordance with the invention. As with the first and second embodiments described above, the contour machining head 300 is dynamically balanced and capable of operation which is play-free with zero backlash for optimum precision and near-perfect machining qualities. Counterweights are used to maintain the dynamic balance of the contour machining head 300 to such a level of precision that relatively high rotational speeds of 1000 rpm or higher can be attained during machining.

Referring to FIGS. 7–9, which are a perspective side view, a diagrammatic front view, and a partially cut away perspective view of the third embodiment of a contour machining head 300, respectively, the contour machining head 300 receives a transmission arbor 302. The contour machining head 300 includes an arbor cap 304 that has a corresponding opening configured to receive a transmission arbor 302. The arbor cap 304 and transmission arbor 302 are connected to each other using a set screw 306 or other appropriate fasteners. Typically, the transmission arbor 302 is housed within a machining spindle (not shown) that is rotated by a driving system (not shown), which in turn provides a rotational force to the contour machining head 300. The contour machining head 300 may be mounted in various configurations of a machining spindle with an associated machining head support such as a spherical housing, or similar type of housing that permits angular displacement of the contour machining head 300 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

The transmission arbor is typically driven by a rotational drive motor, and with a combination of associated bearings and pinions may drive the arbor cap 304 in a rotational direction. An exemplary transmission arbor, rotational drive motor, and associated bearings and pinions that can be used with a contour machining head 300 are shown and described in related U.S. application Ser. No. 09/828,543, filed Apr. 6, 2001.

A second degree of motion is accomplished by an axial drive motor or other drive means (not shown). The arbor cap 304 connects to the distal end of a transmission arbor which is connected at its proximal end to an axial drive motor or other drive means for effecting axial movement of the arbor cap 304. Axial movement of the arbor cap 304 provides radial movement or feed of a carriage 308. With this configuration, the contour machining head 300 is capable of working in both directions, forward and backward. The separate controls for feed and rotation allow the rate of radial travel of the bit tool to be varied during operation as needed, independent of rotation, permitting rapid variation in cutting diameter to create different profiles in a workpiece. An exemplary axial drive motor that can be used with a contour machining head 300 is shown and described in related U.S. application Ser. No. 09/828,543, filed Apr. 6, 2001.

A third degree of motion is accomplished by another motor (not shown) which drives axial feed and retraction of the spindle and its sheath, independent of the carriage feed described above. This function provides fine adjustment of the height of the contour machining head 300 and bit tool 310 over the workpiece and controls cutting depth, including feeding the bit tool 310 during rotation to achieve the desired depth. An exemplary motor for fine adjustment that can be used with a contour machining head 300 is shown and described in related U.S. application Ser. No. 09/828,543, filed Apr. 6, 2001.

As shown in FIGS. 7–9, the arbor cap 304 can receive a distal end of a transmission arbor 302. The arbor cap 304 has a forked shape with two lower arms 304a, 304b, and a bore that extends through each of the lower arms 304a, 304b. The bore retains an axle 312 with the ends of the axle 312 extending beyond the edges of the arbor cap 304. Connecting rod 314 pivotally connects at its first end to the axle 312, with the first end of the connecting rod 314 positioned between arbor cap arms 304a, 304b, as shown in FIG. 9. Connecting rod 314 pivotally connects at its second end to a first end of a cantilever 318 via axle 320. As illustrated in the perspective views of FIGS. 7 and 9, cantilever 318 is a forked structure, with two arms 318a, 318b at its first end adjacent to axle 320 and one arm at its opposing second end. This forked configuration is selected for ease of manufacture and assembly. Other variations will be apparent to those of skill in the art, including one or two one-arm cantilevers. Cantilever 318 pivotally mounts on a cantilever axle 321 which connects in a fixed position to the interior of housing 322. The second end of cantilever 318 pivotally connects via axle 324 to the first end of a pair of connecting rods 326, 326'. The second ends of connecting rods 326, 326' pivotally connect via axle 328 to the carriage 308.

The carriage 308 has an upward extension tab through which axle 328 passes to provide connection to connecting rods 326, 326'. Carriage 308 slides radially within contour machining head 300 on carriage guide 330, which can be formed integrally within housing 322 or attached as a separate component, as shown in FIGS. 7–9. The carriage guide 330 has rails (not shown) formed on opposite sides of a central portion opening (not shown). The spacing of the opening is adapted to closely fit an outer width of the carriage 308 so that the carriage 308 will slide with minimal resistance along the lengths of rails. Carriage tab 332 extends downward from carriage 308. A threaded bore through carriage tab 332 is adapted to receive locking screw 334 which is used to attach bit mount 336 from which a bit 338 and associated bit tool 310 extends. As previously described, the bit tool 310 is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape of the bit tool 310 fits closely within a recess formed in the distal end of bit mount 336 to prevent movement of bit tool 310 relative to bit mount 336. For attachment of a new bit 338, locking screw 340 is inserted through a slot in bit mount 336. Bit mount 336 is positioned along the carriage 308 by positioning the bit mount 336 relative to the locking screw 334, after which locking screw 334 is tightened to fix the bit mount 336 in place. Note that the slot can be open-ended, i.e., U-shaped, or closed at the end. The upper edge of bit mount 336 should preferably abut the bottom surface of carriage 308 for enhanced stability.

As illustrated in FIGS. 7–9, carriage 308 is slidably disposed within carriage guide 330 which connects to the lower portion of housing 322 via a plurality of screws or other fasteners (not shown). An upward motion of the transmission arbor 302 pulls the arbor cap 304 upward which, through the linkage provided by connecting rod 314 lifts the first end of cantilever 318. Cantilever 318 pivots on fixed axle 320 causing the second end of cantilever 318 to swing inward toward a central axis 342 of the contour machining head 300. This motion pushes connecting rod 326 against the carriage 308, and through its connection via axle 328 forces carriage 308 to move along the carriage guide 330, moving cutting bit 310 radially inward, decreasing the cutting diameter. Through the same series of linkages, a downward motion of the transmission arbor 302 causes the carriage 308 to slide outward, increasing the cutting diameter.

The carriage guide 330 or lower portion of the housing 322 includes a pilot 344 that extends downward away from the carriage 308 and along the central axis 342. The pilot 344 permits the contour machining head 300 to locate and maintain a fixed position with respect to the workpiece upon which the bit tool 310 is to be applied. For example, the pilot 344 permits centering of the contour machining head 300 within an opening in a workpiece to be cut. For engine cylinder head applications, pilot 344 may be inserted into a valve guide which is centered on a valve seat. For other applications, such as manufacturing, the pilot 344 may be omitted, or a pre-drilled pilot hole will preferably be provided to guide the contour machining head 300 for centering. Pilot 344 is typically held within a corresponding pilot socket in the carriage guide 330 or lower portion of the housing 322. A hydraulic clamp 346 is placed inside the corresponding pilot socket. Clamp 346 is activated by turning one or more screws or knobs which extend into an associated oil reservoir (not shown). Displacement by the screws forces oil from reservoir into the clamp 346, coaxially locking the pilot 342 so that it is held rigidly and concentrically with respect to the contour machining head 300.

Since the contour machining head 300 typically operates at a relatively high rotational speed, from 1000 rpm or higher, radial offset of the carriage 308 should be dynamically counterbalanced to maintain centering around the central axis 342 of the contour machining head 300. Counterbalancing of the contour machining head 300 is provided by an associated counterweight assembly 348–372 shown in FIGS. 7–9.

Counterweights 348, 350 associated with the counterweighting assembly move in a direction opposite to that of the carriage 308. The mass of the counterweights 348, 350 is selected to compensate exactly for the variation of the position of the center of gravity of the contour machining head 300 when the carriage 308 is moving.

Connecting rods 352, 354, connected to arbor cap 304 at shared axle 312, transfer force from the arbor cap 304 to cantilever 356. Cantilever 356 connects at its first end to connecting rods 352, 354 via shared axle 312 and pivots on fixed cantilever axle 358 which in turn connects to housing 322. As shown in FIG. 9, cantilever 356 is configured with two separate upper cantilever arms, 356a, 356b and with two separate lower cantilever arms at a second end. The second end of cantilever 356 connects respectively to connecting rods 360, 362 via shared axle 364. The second ends of connecting rods 360, 362 connect to respective counterweights 348, 350 via respective axles 366, 368. Counterweights 348, 350 are slidably disposed within counterweight guides 370, 372, respectively, which are disposed at equal distances from the central axis 342 of rotation of the contour machining head 300 to ensure proper balance in all directions. It may be appropriate to fine tune the counterweights 348, 350 to optimize balance relative to the carriage 308 and associated carriage parts. In one embodiment, a pin can extend from the counterweights 348, 350 to allow placement of small annular weights, which can be stacked over pin to slightly increase the weight as needed for dynamic counterbalancing. Alternatively, small weights can be added by directly attaching them to the counterweights 348, 350 using small screws which are inserted into a threaded bore in each counterweight 348, 350. The screws can be used to add one or more small washers to provide additional weight to each counterweight 348, 350.

When the transmission arbor 302 is moved upward, the arbor cap 304 pulls connecting rod 314 upwards, which in turn pulls up on the first ends of cantilever 360. This movement causes the cantilever 356 to pivot on fixed cantilever axle 358, and the second end of the cantilever 356 moves towards the central axis 342 of the contour machining head 300. Through the connection provided by connecting rods 360, 362, and axles 366, 368, counterweights 348, 350 are forced inward. Thus, the upward movement of the transmission arbor 302 causes both the carriage 308 and counterweights 348, 350 to move, so that with an upward movement of transmission arbor, both the carriage 308 and counterweights 348, 350 move radially inward to maintain dynamic balancing around the rotational center.

Alternatively, when the transmission arbor 302 moves downward, both the carriage 306 and counterweights 348, 350 move radially outward. The combination of the 308 and counterweight assembly 348–372 permit the contour machining head 300 to be used for either radial outward or radial inward cutting.

Figure 10:
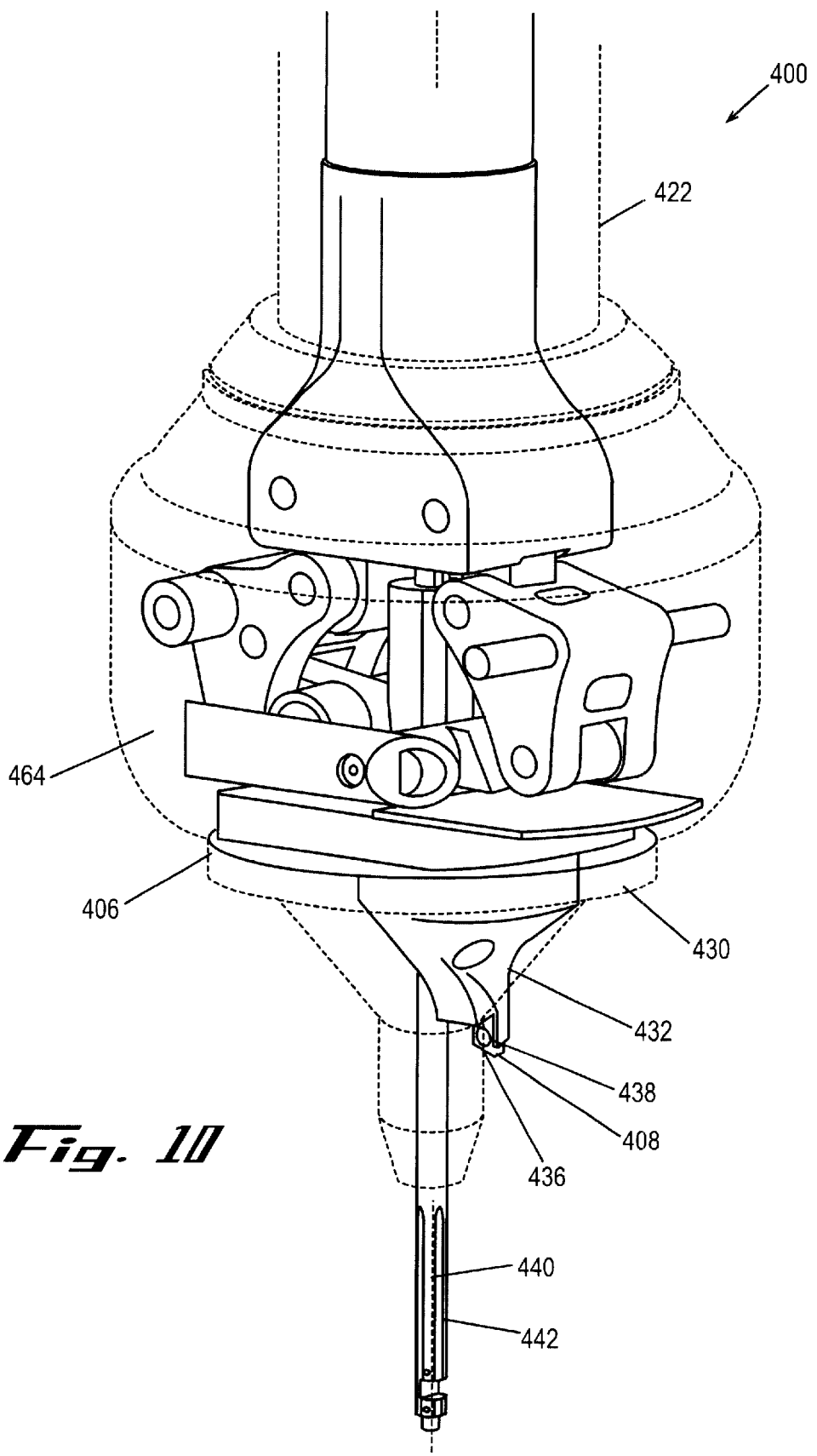
FIG. 10 is a perspective view of a fourth embodiment of a contour machining head in accordance with the invention.
Figure 11:
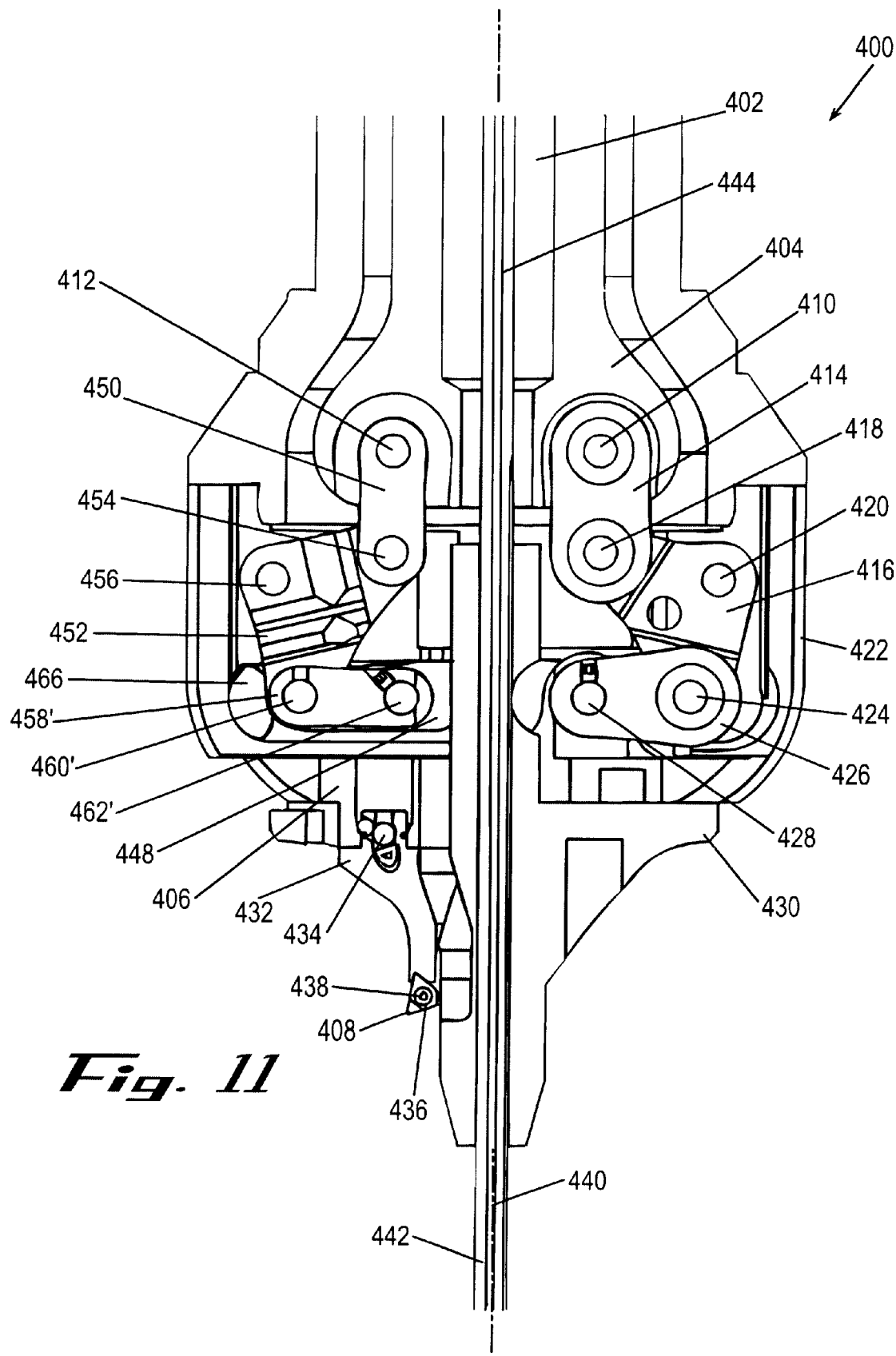
FIG. 11 is a diagrammatic front view of the contour machining head shown in FIG. 10.
Figure 12:
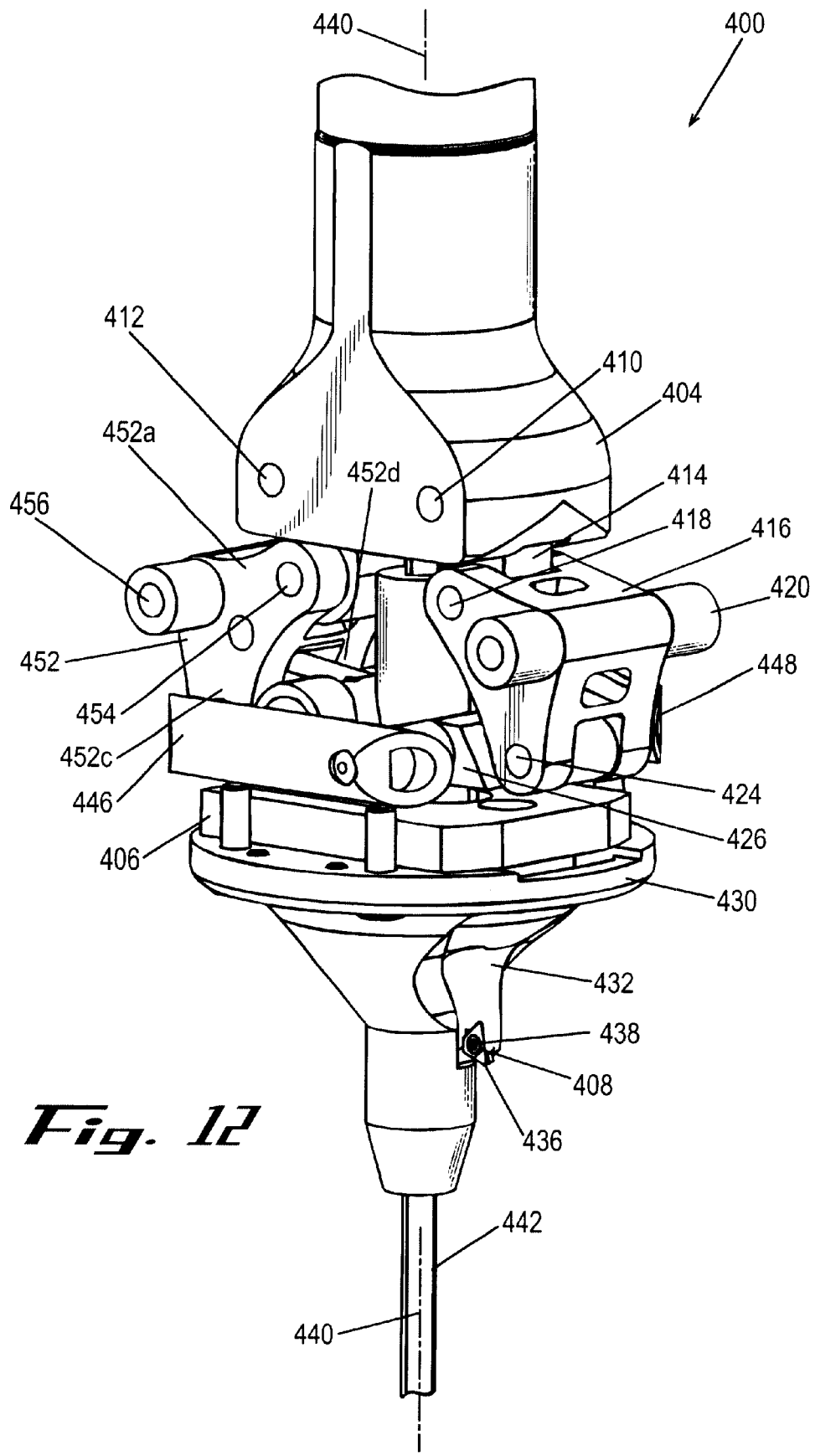
FIG. 12 is a perspective side view, partially cut away, of the contour machining head shown in FIGS. 10 and 11

FIGS. 10–12 illustrate a fourth embodiment of a contour machining head 400 for a line transfer system in accordance with the invention. Similar to the first, second, and third embodiments, the contour machining head 400 is dynamically balanced and capable of operation which is play-free with zero backlash for optimum precision and near-perfect machining qualities. Counterweights are used to maintain the dynamic balance of the contour machining head 400 to such a level of precision that relatively high rotational speeds of 1000 rpm or higher can be attained during machining. A contour machining head 400 is mounted to a machining spindle 402 and rotated by a driving system (not shown). The contour machining head 400 may be mounted in various configurations of a machining spindle with an associated machining head support such as a spherical housing, or similar type of housing that permits angular displacement of the contour machining head 400 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

Referring to FIGS. 10–12, which are a perspective side view, a diagrammatic front view, and a partially cut away perspective view of the fourth embodiment of a contour machining head 400, respectively, the contour machining head 400 receives a transmission arbor 402. The contour machining head 400 includes an arbor cap 404 that has a corresponding opening configured to receive a transmission arbor 402. The arbor cap 404 and transmission arbor 402 connect to each other using a set screw or other appropriate fasteners (not shown). Typically, the transmission arbor 402 is housed within a machining spindle (not shown) that is rotated by a driving system (not shown), which in turn provides a rotational force to the contour machining head 400. The contour machining head 400 may be mounted in various configurations of a machining spindle with an associated machining head support such as a spherical housing, or similar type of housing that permits angular displacement of the contour machining such as 400 at angles needed to access the workpiece such as a valve seats. In other applications, such as a line transfer system, the contour machining head can be mounted with a spherical housing for angular displacement, or a fixed mounting that permits up and down movement, and possibly movement in the x-y plane. Selection of appropriate machining head support for the desired application will be apparent to one skilled in the art.

The transmission arbor 402 is typically driven by a rotational drive motor, and with a combination of associated bearings and pinions may drive the arbor cap 404 in a rotational direction. An exemplary transmission arbor, rotational drive motor, and associated bearings and pinions that can be used with a contour machining head 400 are shown and described in related U.S. application Ser. No. 09/828,543, filed Apr. 6, 2001.

A second degree of motion is accomplished by an axial drive motor or other drive means (not shown). The arbor cap 404 connects to the distal end of a transmission arbor 402 which connects at its proximal end to an axial drive motor or other drive means for effecting axial movement of the arbor cap 404. Axial movement of the arbor cap 404 provides radial movement or feed of a carriage 406. With this configuration, the contour machining head 400 is capable of working in both directions, forward and backward. The separate controls for feed and rotation allow the rate of radial travel of the bit tool to be varied during operation as needed, independent of rotation, permitting rapid variation in cutting diameter to create different profiles in a workpiece. An exemplary axial drive motor that can be used with a contour machining head 400 is shown and described in related U.S. application Ser. No. 09/828,543, filed Apr. 6, 2001.

A third degree of motion is accomplished by another motor (not shown) which drives axial feed and retraction of the spindle and its sheath, independent of the carriage feed described above. This function provides fine adjustment of the height of the contour machining head 400 and bit tool 408 over the workpiece and controls cutting depth, including feeding the bit tool 408 during rotation to achieve the desired depth. An exemplary motor for fine adjustment that can be used with a contour machining head 400 is shown and described in related U.S. application Ser. No. 09/828,543, filed Apr. 6, 2001.

As shown in FIGS. 10–12, the arbor cap 404 has a pair of bores through the lower portion that each retains an axle 410, 412 with the ends of each axle 410, 412 extending beyond the edges of the arbor cap 404. Connecting rod 414 pivotally connects at its first end to the axle 410, with the first end of the connecting rod 414 positioned within a recess in the lower portion of the arbor cap 404 as shown in FIGS. 11 and 12. Connecting rod 414 pivotally connects at its second end to a first end of a cantilever 416 via axle 418. As illustrated in FIGS. 10–12, cantilever 416 is a triangular-shaped structure, with two arms at its first end adjacent to axle 418 and two arms at its opposing second end. This configuration is selected for ease of manufacture and assembly. Other variations will be apparent to those of skill in the art, including one or two one-arm cantilevers. Cantilever 416 pivotally mounts on a cantilever axle 420 which connects in a fixed position to the interior of housing 422. The second end of cantilever 416 pivotally connects via axle 424 to the first end of a connecting rod 426. The second end of connecting rod 426 pivotally connects via axle 428 to the carriage 406.

The carriage 406 has an upward extension tab through which axle 428 passes to provide connection to connecting rod 426. Carriage 406 slides radially within contour machining head 400 on carriage guide 430, which can be formed integrally within housing 422 or attached as a separate component, as shown in FIGS. 10–12. The carriage guide 430 has rails (not shown) formed on opposite sides of a central portion opening (not shown). The spacing of the opening is adapted to closely fit an outer width of the carriage 406 so that the carriage 406 will slide with minimal resistance along the lengths of rails. Bit mount 432 extends downward from carriage 406. A threaded bore through bit mount 432 is adapted to receive locking screw 434 which is used to connect bit mount 432 to the carriage 406. A bit 436 and associated bit tool 408 extend from the bit mount 432. As previously described, the bit tool 408 such as a cutting tip is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape of the bit tool 408 fits closely within a recess formed in the distal end of bit mount 432 to prevent movement of bit tool 408 relative to bit mount 432. For attachment of a new bit 436, locking screw 438 is inserted through a slot in bit mount 432. Bit mount 432 is positioned along the carriage 406 by positioning the bit mount 432 relative to the locking screw 434, after which locking screw 434 is tightened to fix the bit mount 432 in place. The upper edge of bit mount 432 should abut the bottom surface of carriage 406 for good stability.

As illustrated in FIGS. 10–12, carriage 406 is slidably disposed within carriage guide 430 which connects to the lower portion of housing 422 via a plurality of screws or other fasteners (not shown). An upward motion of the transmission arbor 402 pulls the arbor cap 404 upward which, through the linkage provided by connecting rod 414 lifts the first end of cantilever 416. Cantilever 416 pivots on fixed axle 420 causing the second end of cantilever 416 to swing inward toward a central axis 440 of the contour machining head 400. This motion pushes connecting rod 426 against the carriage 406, and through its connection via axle 428 forces carriage 406 to move along the carriage guide 430, moving cutting bit 408 radially outward, increasing the cutting diameter. Note that the direction of movement for this embodiment is opposite from the first, second, and third embodiments described above. Through the same series of linkages, a downward motion of the transmission arbor 402 causes the second end of the cantilever 426 to pivot outward away from the central axis 440, moving cutting bit 408 radially inward and decreasing the cutting diameter.

The carriage guide 430 or lower portion of the housing 422 includes a pilot 442 that extends downward away from the carriage 406 and along the central axis 440. The pilot 442 permits the contour machining head 400 to locate and maintain a fixed position with respect to the workpiece upon which the bit tool 408 is to be applied. For example, the pilot 442 permits centering of the contour machining head 400 within an opening in a workpiece to be cut. For engine cylinder head applications, pilot 442 may be inserted into a valve guide which is centered on a valve seat. For other applications, such as manufacturing, the pilot 442 may be omitted, or a pre-drilled pilot hole will preferably be provided to guide the contour machining head 400 for centering. Pilot 442 is typically held within a corresponding pilot socket in the carriage guide 430 or lower portion of the housing 422. A hydraulic clamp 444 is placed inside the corresponding pilot socket. Clamp 444 activated by turning one or more screws or knobs which extend into an associated oil reservoir (not shown). Displacement by the screws forces oil from reservoir into the clamp 444, coaxially locking the pilot 442 so that it is held rigidly and concentrically with respect to the contour machining head 400.

Since the contour machining head 400 typically operates at a relatively high rotational speed, from 1000 rpm or higher, radial offset of the carriage 406 should be dynamically counterbalanced to maintain centering around the central axis 440 of the contour machining head 400. Counterbalancing of the contour machining head 400 is provided by an associated counterweight assembly 446–464 shown in FIGS. 10–12.

Counterweights 446, 448 associated with the counterweighting assembly moves in a direction opposite to that of the carriage 406. The mass of the counterweights 446, 448 is selected to compensate exactly for the variation of the position of the center of gravity of the contour machining head 400 when the carriage 406 is moving.

Connecting rod 450, connected to the arbor cap 404 at axle 412, transfers force from the arbor cap 404 to cantilever 452. Cantilever 452 connects at its first end to connecting rod 450 via axle 454 and pivots on fixed cantilever axle 456 which in turn connects to housing 422. As shown in FIG. 12, cantilever 452 is configured with two upper cantilever arms 452a, 452b and with two lower cantilever arms 452c, 452d at a second end. The end of each lower cantilever cantilever arm 452c, 452d connects respectively to connecting rods 458, 458' via respective axles 460, 460'. The second ends of connecting rods 458', 458' each connect to respective counterweights 448, 450 via respective axles 462, 462'. Counterweights 448, 450 are slidably disposed within respective counterweight guides 464, 466 which is disposed adjacent to the central axis 440 of rotation of the contour machining head 400 to ensure proper balance in all directions. It may be necessary to fine tune the counterweights 448, 450 to optimize balance relative to the carriage 406 and associated carriage parts. In one embodiment, a pin can extend from the counterweights 448, 450 to allow placement of small annular weights, which can be stacked over pin to slightly increase the weight as needed for dynamic counterbalancing. Alternatively, small weights can be added by directly attaching them to the counterweights 448, 450 using small screws which are inserted into a threaded bore in the counterweights 448, 450. The screws can be used to add one or more small washers to provide additional weight to the counterweights 448, 450.

When the transmission arbor 402 is moved upward, the arbor cap 404 pulls connecting rod 414 upward, which in turn pulls up on the first end of cantilever 416. This movement causes the cantilever 416 to pivot on fixed cantilever axle 420, and the second end of the cantilever 416 moves towards the central axis 440 of the contour machining head 400. Through the connection provided by connecting rod 426 and axles 424, 428, the bit tool 408 moves away from the central axis 440. Simultaneously, the upward force on the arbor cap 404 causes the cantilever 452 to pivot on fixed cantilever axle 456, and the second end of the cantilever 452 moves towards the central axis 440 of the contour machining head 400. Through the connection provided by connecting rods 458, 458' and axles 460, 460', 462, 462', the counterweights 448, 450 move opposite the movement of the carriage 406. Thus, the upward movement of the transmission arbor 402 causes both the carriage 406 and counterweights 448, 450 to move, so that with an upward movement of transmission arbor 402, both the carriage 406 and counterweights 448, 450 move radially outward to maintain dynamic balancing around the rotational center.

Alternatively, when the transmission arbor 402 moves downward, both the carriage 406 and counterweights 448, 450 move radially inward. The combination of the carriage 406 and counterweight assembly 448–466 permit the contour machining head 400 to be used for either radial outward or radial inward cutting.

FIGS. 13–20 illustrate embodiments of a line transfer system incorporating one or more module comprising with a contour machining head. Note that various configurations and embodiments of a contour machining head can be used alone or interchanged and utilized with any embodiment of a line transfer system in accordance with the invention. Furthermore, note that any number of contour machining heads or different types of contour machining heads may be utilized with any embodiment of a line transfer system in accordance with the invention. The embodiments described herein are by way of example only, and are not intended to limit the number or type of contour machining heads used with a line transfer system in accordance with the invention.

Figure 13:
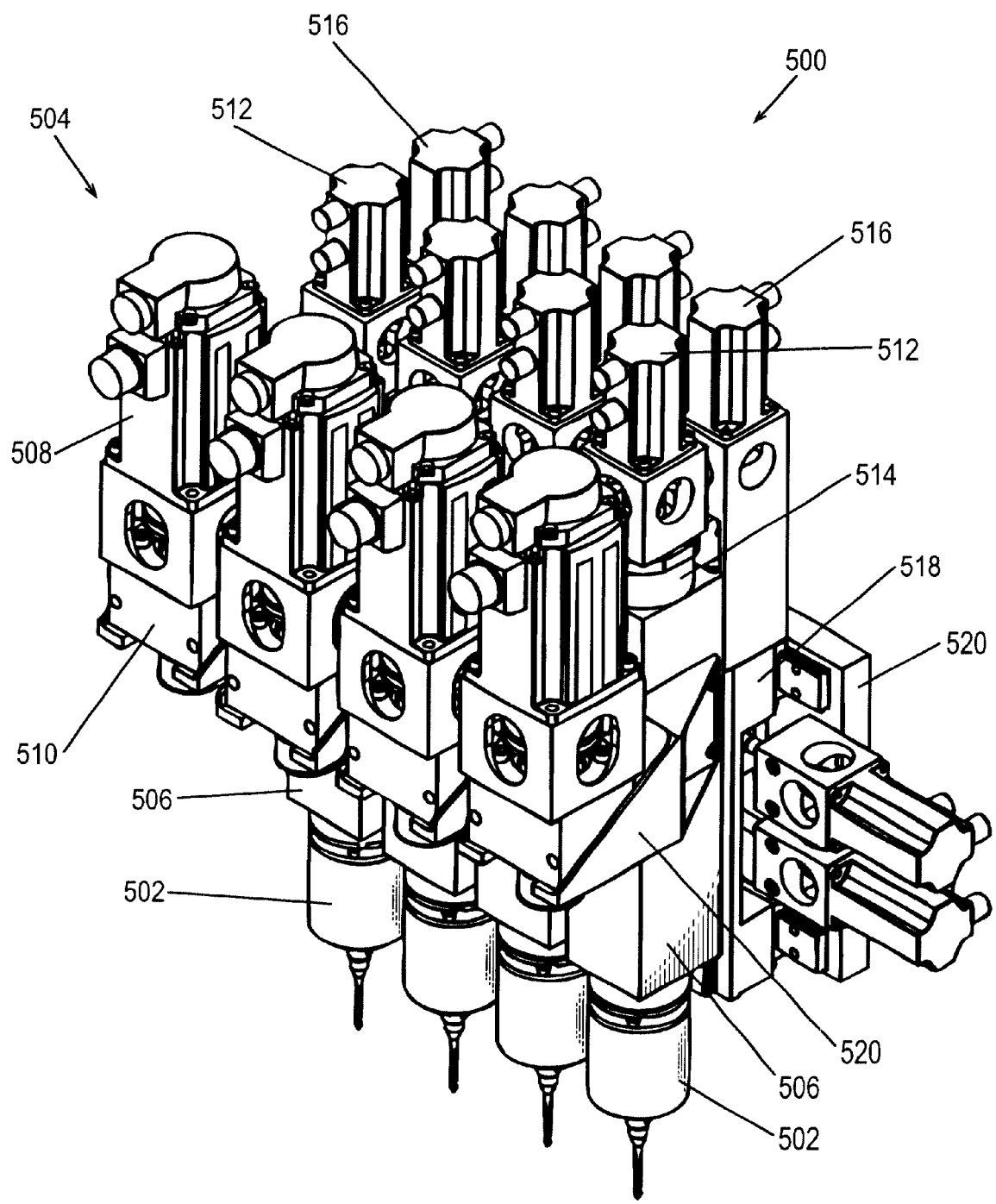
FIG. 13 is a perspective view of a line transfer system with an arrangement of a plurality of contour machining heads in accordance with the invention.
Figure 14:
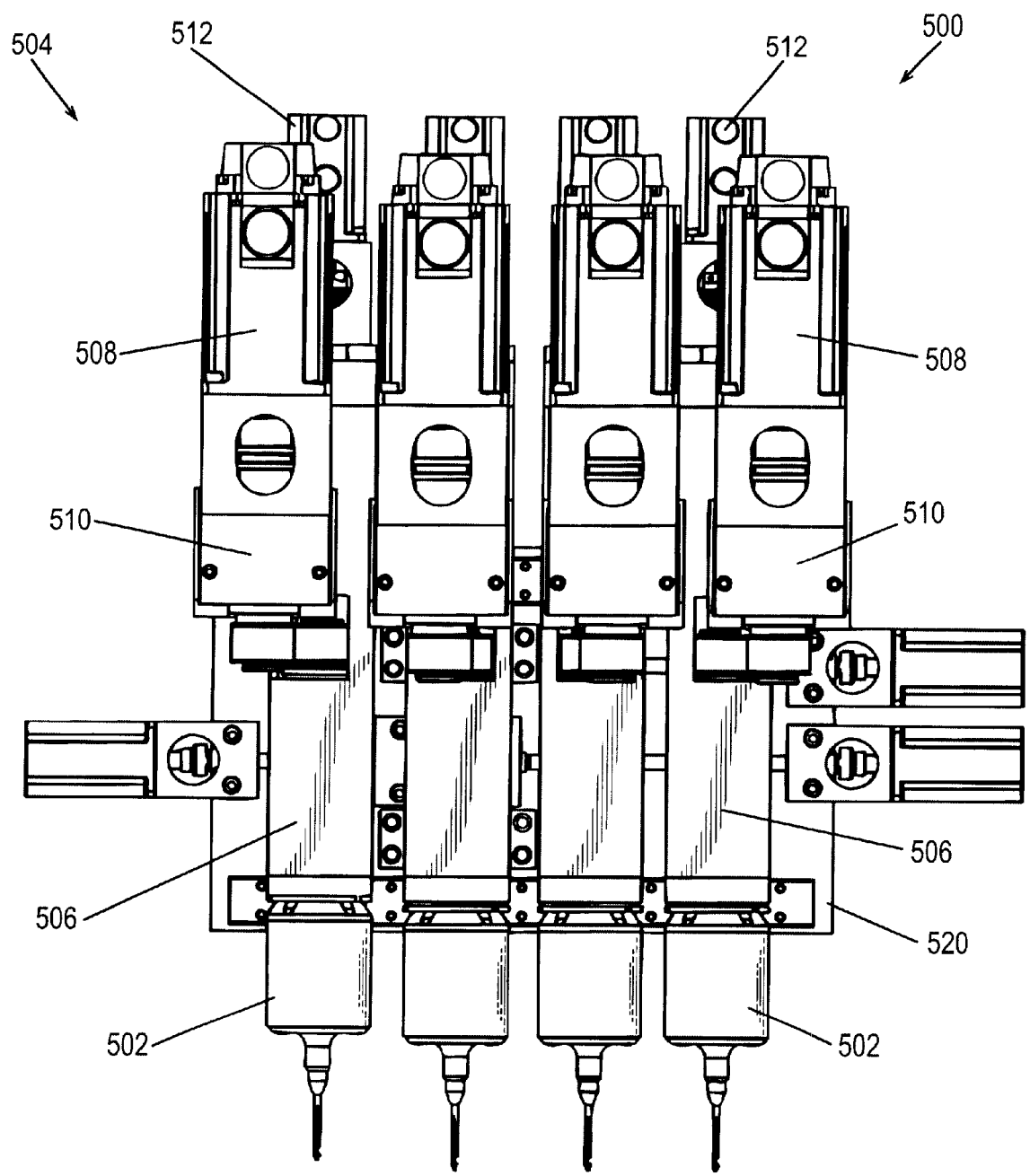
FIG. 14 is a perspective view of a front view of the line transfer system with an arrangement of contour machining heads shown in FIG. 13.
Figure 15:
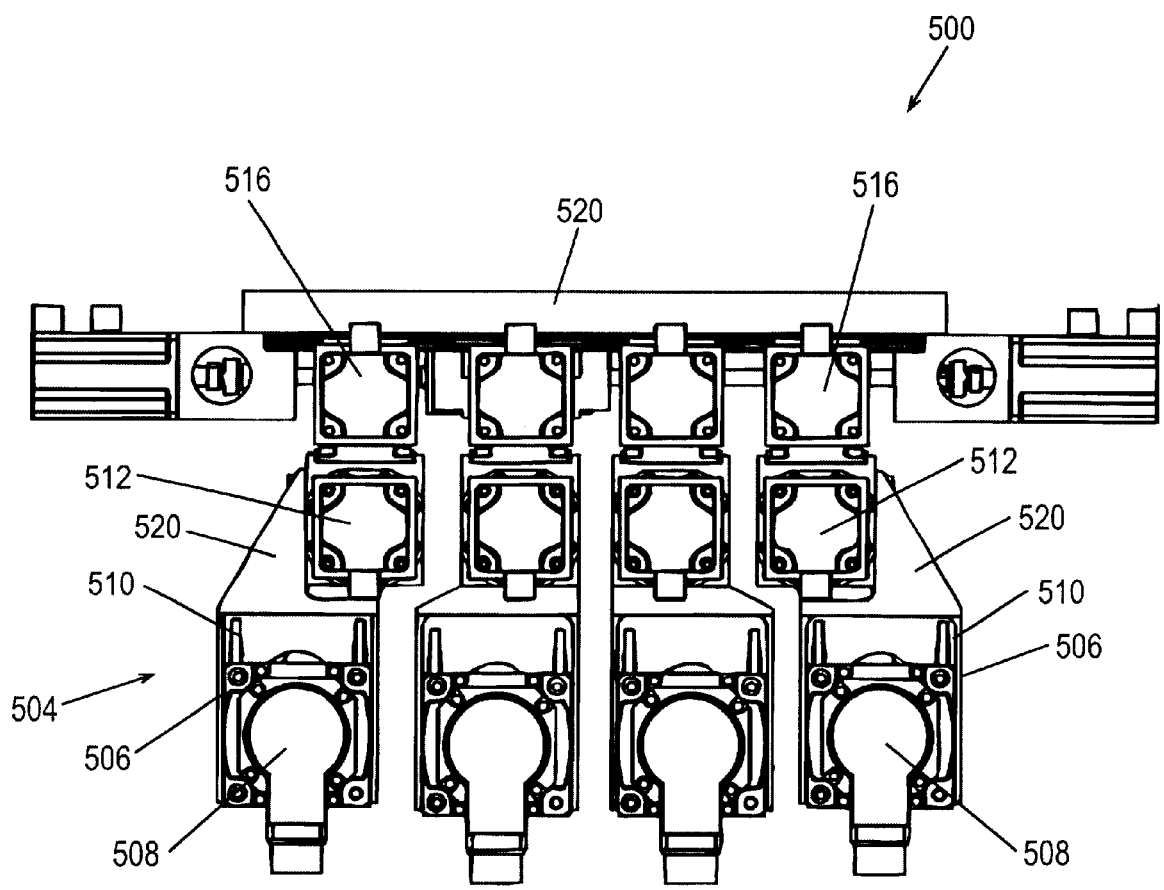
FIG. 15 is a top view of the line transfer system with an arrangement of contour machining heads shown in FIGS. 13 and 14.

FIGS. 13–15 illustrate a line transfer system 500 with a plurality of modules, each having a contour machining head 502. A line transfer system 500 with a plurality of contour machining heads 502 is configured to simultaneously machine a plurality of workpieces using one or more contour machining heads 502. Furthermore, a line transfer system 500 with a plurality of contour machining heads 502 can be configured with any number or arrangement of contour machining heads 502 for simultaneous machining of multiple workpieces or multiple locations on a workpiece, or for machining in rapid succession. Preferably, a line transfer system 500 is configured with one or more contour machining heads as previously shown and described in FIGS. 1–12. Other embodiments and configurations of contour machining heads can be utilized with the invention, such as those already incorporated by reference.

Referring now to FIGS. 13–15, in which FIG. 13 is a perspective view, FIG. 14 is a perspective view of a front view, and FIG. 15 is a top view of a line transfer system 500 with a plurality of contour machining heads 502, respectively, a line transfer system 500 can be modularized into an arrangement of contour machining heads 502. For example, four contour machining heads 502 can be modularized into a single group of set for a line transfer system 500 that can be transported to, installed at, and operated at a remote location, such as a customer's custom machining facility.

The line transfer system 500 shown in FIGS. 13–15 includes one or more contour machining heads 502 and a corresponding driving system 504. The contour machining heads 502 are positioned near the lower portion of the system 500 to provide access to one or more workpieces (not shown) to be machined. Each driving system 504 is positioned in an overhead position relative to its respective contour machining head 502. Each driving system 504 includes a housing or machine sphere 506, rotational drive motor 508, transmission linkage 510, motor 512, a transmission linkage 514, a stepper motor 516, and transmission linkage 518.

The contour machining heads 502 are configured to be received by the lower portion of the machine sphere 506. As previously disclosed and described, a spindle sheath (not shown) is disposed and mounted within the machine sphere 514. A machining spindle (not shown) mounts within the spindle sheath and includes a distal end configured for receiving a contour machining head 502. A transmission arbor associated with the machining spindle (not shown) is configured to transmit a force from a driving system 504 to the contour machining head 502. An exemplary machining spindle, machining head support, and driving system that can be used with a contour machining head 100 are shown and disclosed in related U.S. application Ser. No. 09/828,543, filed Apr. 6, 2001. An alternate driving system comprises a belt drive assembly which permits multiple machining heads to be driven using a single drive motor.

A rotational drive motor 508 connects to the transmission arbor within the machine sphere 506 via the transmission linkage 510. The transmission linkage can be a sliding arm homokinetic transmission. When the rotational drive motor 508 is activated, a rotational force is transferred via the transmission linkage 510 to the transmission arbor, which in turn transfers a rotational force to the spindle. This rotational force causes the contour machining head 502 to rotate with respect to a rotational axis. For example, the motor can be a brushless AC servo motor, such as Model No. HC-MF-13-EC available from Mitsubishi Corporation of Japan.

A motor 512 connects to the proximal end of the transmission arbor within the machine sphere 506 via the transmission linkage 514. When activated, the motor 512 provides a force to the transmission linkage 514 that is translated to an axial force upon the transmission arbor. The axial force is then transferred from the transmission arbor to the contour machining head 502. This axial force causes the contour machining head 502 to provide an inward and outward cutting force.

A stepper motor 516 connects to the spindle sheath within the machine sphere 506 via the transmission linkage 518. When activated, the stepper motor 516 provides an axial force to drive the feed and retraction of the spindle sheath within the machine sphere 506. This causes fine tuning adjustment of height over the workpiece and controls cutting depth of the contour machining head 502. For example, the motor may be a stepper motor, servo motor, or prefereably a brushless AC servo motor, such as Model No. HC-MF-13-EC available from Mitsubishi Corporation of Japan.

A spacing motor 520 connects to a respective machine sphere 506 via a spacing linkage 522. When activated, the spacing motor 520 provides a force that can be translated to adjust the horizontal spacing between each contour machining head 502. This permits variable spacing between contour machining heads 502 as well as fine tuning adjustments of horizontal spacing between contour machining heads 502. For example, in a line transfer system 500 with four contour machining heads 502, a spacing motor 520a–c connects to at least three machine spheres 506a–c via a respective spacing linkage 522a–c. At least one of the machine spheres 506d remains in a relative stationary and fixed horizontal position. A leftmost spacing motor 520a controls the horizontal positioning of the contour machining head 502a adjacent to the left side 524 of the line transfer system 500. Adjacent to the right side 526 of the line transfer system 500, a rightmost spacing motor 520b controls the horizontal positioning of the contour machining head 502b. A spacing motor 520c also adjacent to the right side 526 of the line transfer system 500 controls the horizontal positioning of contour machining head 502c. The remaining machine sphere 506d is not connected to a spacing motor, and remains in a stationary and fixed position relative to the other machine spheres 506a–c.

The line transfer system 500 also includes a casing 528 designed to mount various driving system components 506–522 adjacent to each other in a modular-shaped arrangement.

Operational control of the line transfer system 500 shown in FIGS. 13–15 can be implemented by manual movement by an operator or can be automatically controlled by a processor-based platform such as a computer (not shown) working in conjunction with a system controller. For example, the line transfer system 500 can be connected to a computer or other processor-based platform configured to execute a set of instructions incorporating methods and procedures as shown and described by related U.S. application Ser. No. 09/828,543, filed Apr. 6, 2001. An exemplary processor-based platform for automatically controlling a line transfer system 500 is a computer with an Industrial BUS. A computer with an Industrial BUS can utilize a variety of conventional protocols such as BUS CAN, Ethernet, Profi BUS, S BUS, etc. This type of configuration can control the movement of a group of contour machining heads 502 as well as each individual contour machining head 502.

Figure 16:
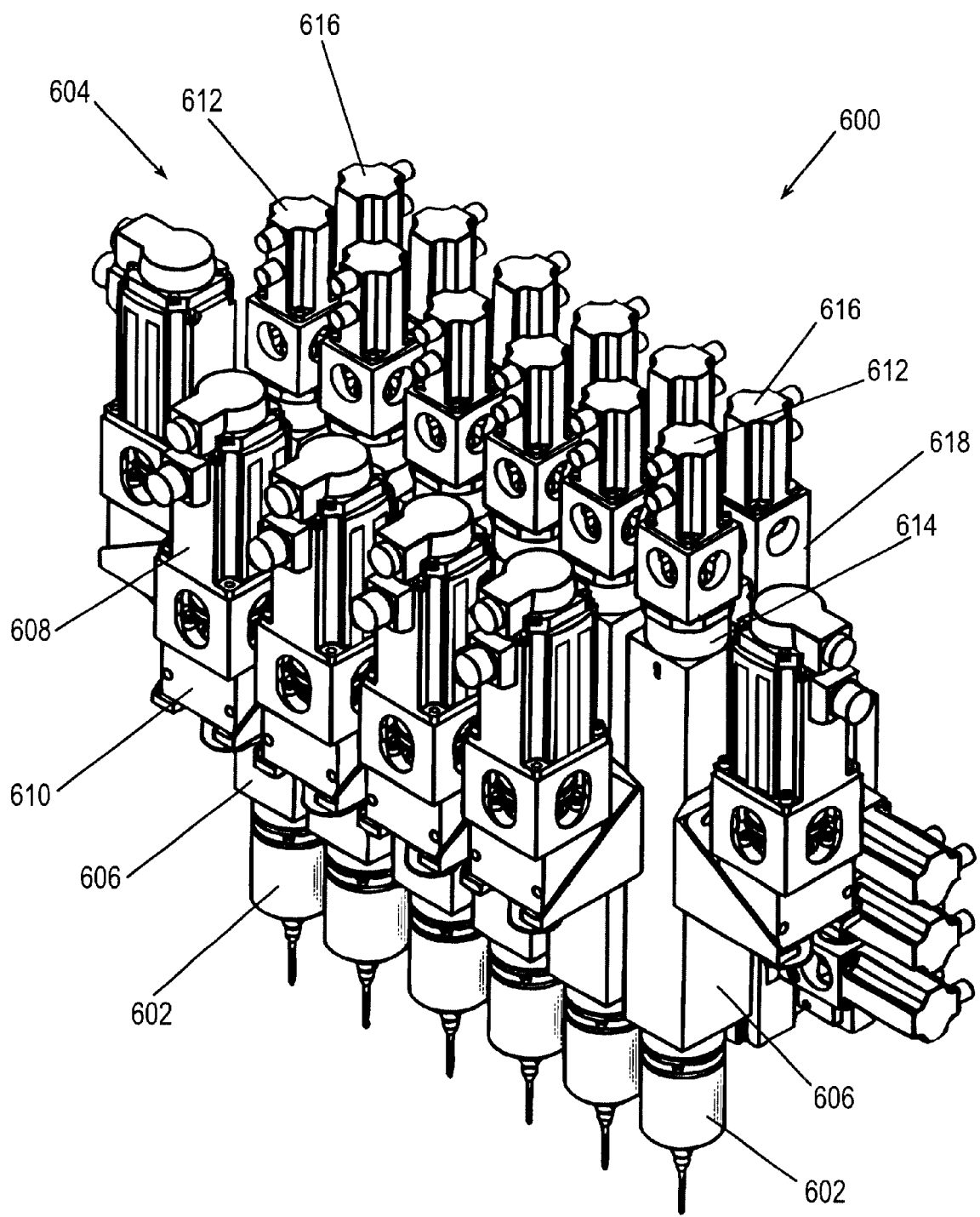
FIG. 16 is a perspective view of another line transfer system with an arrangement of a plurality of contour machining heads in accordance with the invention.
Figure 11:
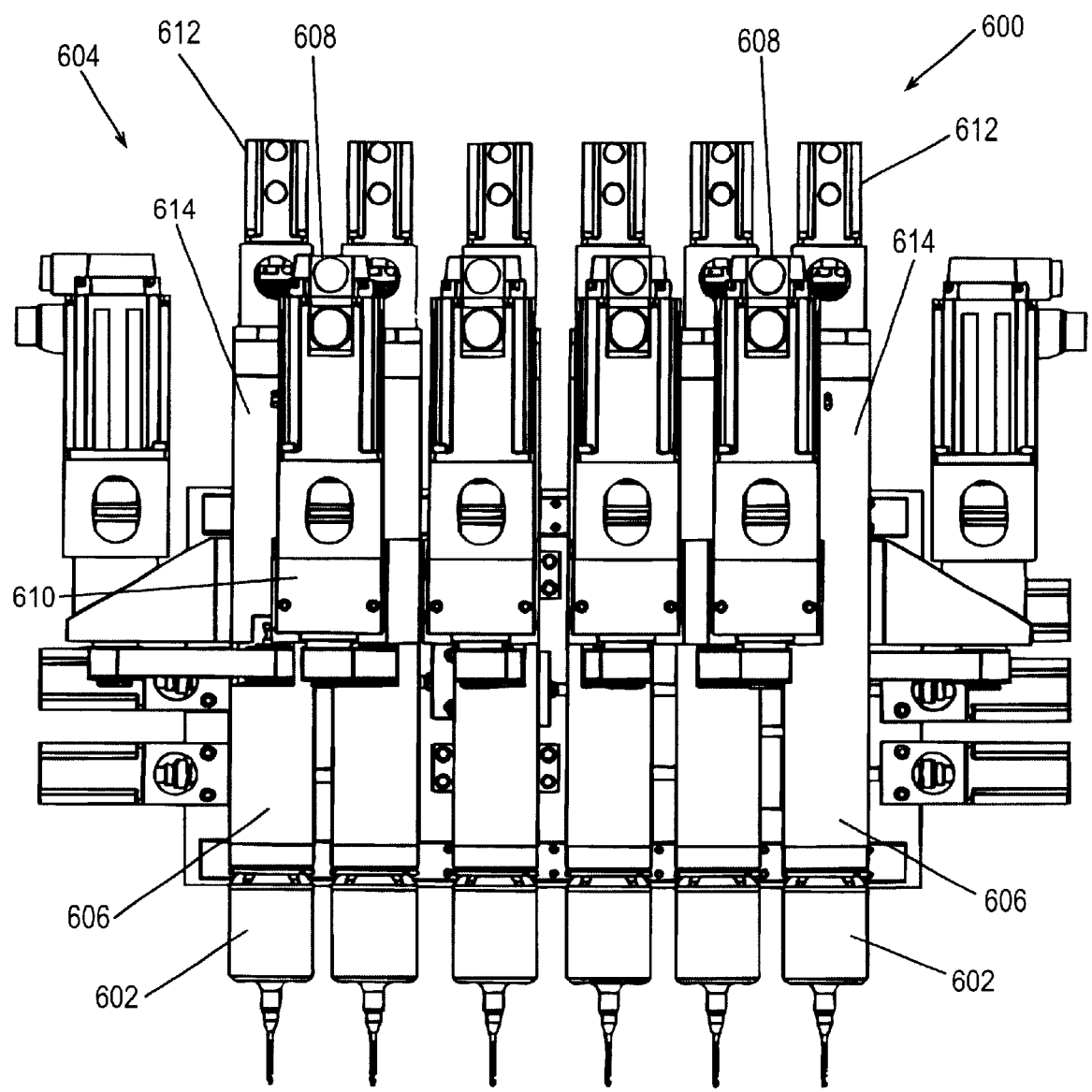
Figure 18:
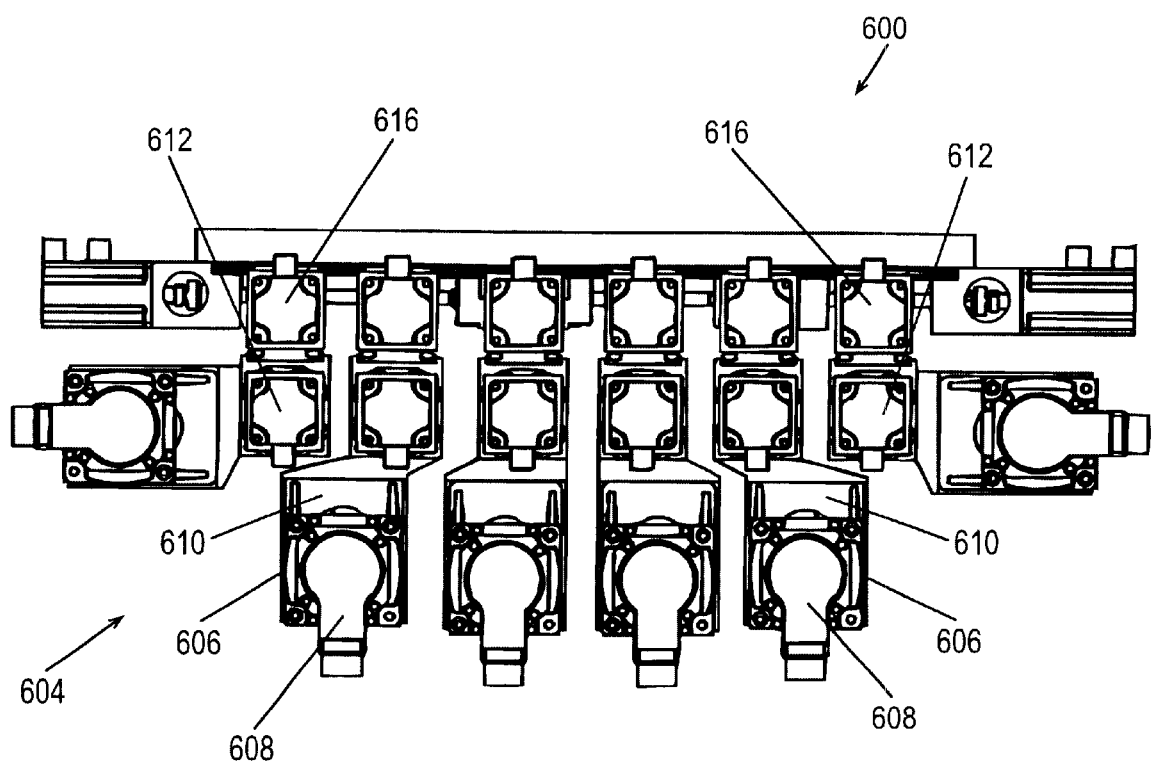
FIG. 18 is a top view of the line transfer system with an arrangement of contour machining heads shown in FIGS. 16 and 17.

FIGS. 16–18 illustrate a line transfer system 600 with a plurality of contour machining heads 602. A line transfer system 600 with a plurality of contour machining heads 602 is configured to simultaneously (or in rapid succession) machine a plurality of workpieces or a plurality of locations on a single workpiece using one or more contour machining heads 602. Furthermore, a line transfer system 600 with a plurality of contour machining heads 602 can be configured with any number or arrangement of contour machining heads 602. Preferably, a line transfer system 600 is configured with one or more contour machining heads as previously shown and described in FIGS. 1–12. Other embodiments and configurations of contour machining heads can be utilized with the invention, such as those incorporated by reference.

Referring now to FIGS. 16–18, in which FIG. 16 is a perspective view, FIG. 17 is a perspective view of a front view, and FIG. 18 is a top view of a line transfer system 600 with a plurality of contour machining heads 602, respectively, a line transfer system 600 can be modularized into an arrangement of contour machining heads 602. For example, a group of six contour machining heads 602 can be modularized so that the line transfer system 600 can be transported to, installed at, and operated at a remote location, such as a customer's custom machining facility.

The line transfer system 600 shown in FIGS. 16–18 includes one or more contour machining heads 602 and a corresponding driving system 604. The contour machining heads 602 are positioned near the lower portion of the system 600 to provide access to one or more workpieces (not shown) to be machined. Each driving system 604 is positioned in an overhead position relative to its respective contour machining head 602. Each driving system 604 includes a housing or machine sphere 606, rotational drive motor 608, transmission linkage 610, motor 612, a transmission linkage 614, a stepper motor 616, and transmission linkage 618.

Similar to the arrangement shown in FIGS. 13–15, a spacing motor 620 connects to a respective machine sphere 606 via a spacing linkage 622. When activated, the spacing motor 620 provides a force that can be translated to adjust the horizontal spacing between each contour machining head 602. This permits variable spacing between contour machining heads 602 as well as fine tuning adjustments of horizontal spacing between contour machining heads 602. For example, in a line transfer system 600 with six contour machining heads 602, a respective spacing motor 620a–e connects to at least five machine spheres 606a–e via a respective spacing linkage 622a–e. At least one of the machine spheres 606f remains in a relative stationary and fixed horizontal position. Two leftmost spacing motors 620a–b control the horizontal positioning of the contour machining heads 602a–b adjacent to the left side 624 of the line transfer system 600. Adjacent to the right side 626 of the line transfer system 600, the three rightmost spacing motors 620c–e control the horizontal positioning of the three contour machining heads 602c–e adjacent to the right side 626. The remaining machine sphere 606f is not connected to a spacing motor, and remains in a stationary and fixed position relative to the other machine spheres 606a–e.

The line transfer system 600 also includes a casing 628 designed to mount various driving system components 606–622 adjacent to each other in a modular-shaped arrangement.

The arrangement and operation of the system 600 shown in FIGS. 16–18 is substantially the same as that shown and described in FIGS. 13–15 above. Operational control of the line transfer system 600 shown in FIGS. 16–18 can be implemented manually by an operator or by automatic control by a processor-based platform such as a computer working in conjunction with a system controller. For example, the line transfer system 600 can be connected to a computer or other processor-based platform configured to execute a set of instructions incorporating methods and procedures as shown and described by related U.S. application Ser. No. 09/828,543, filed Apr. 6, 2001. An exemplary processor-based platform for automatically controlling a line transfer system 600 is a computer with an Industrial BUS. A computer with an Industrial BUS can utilize a variety of conventional protocols such as BUS CAN, Ethernet, Profi BUS, S BUS, etc. This type of configuration can control the movement of a group of contour machining heads 602 as well as each individual contour machining head 602.

Figure 19:
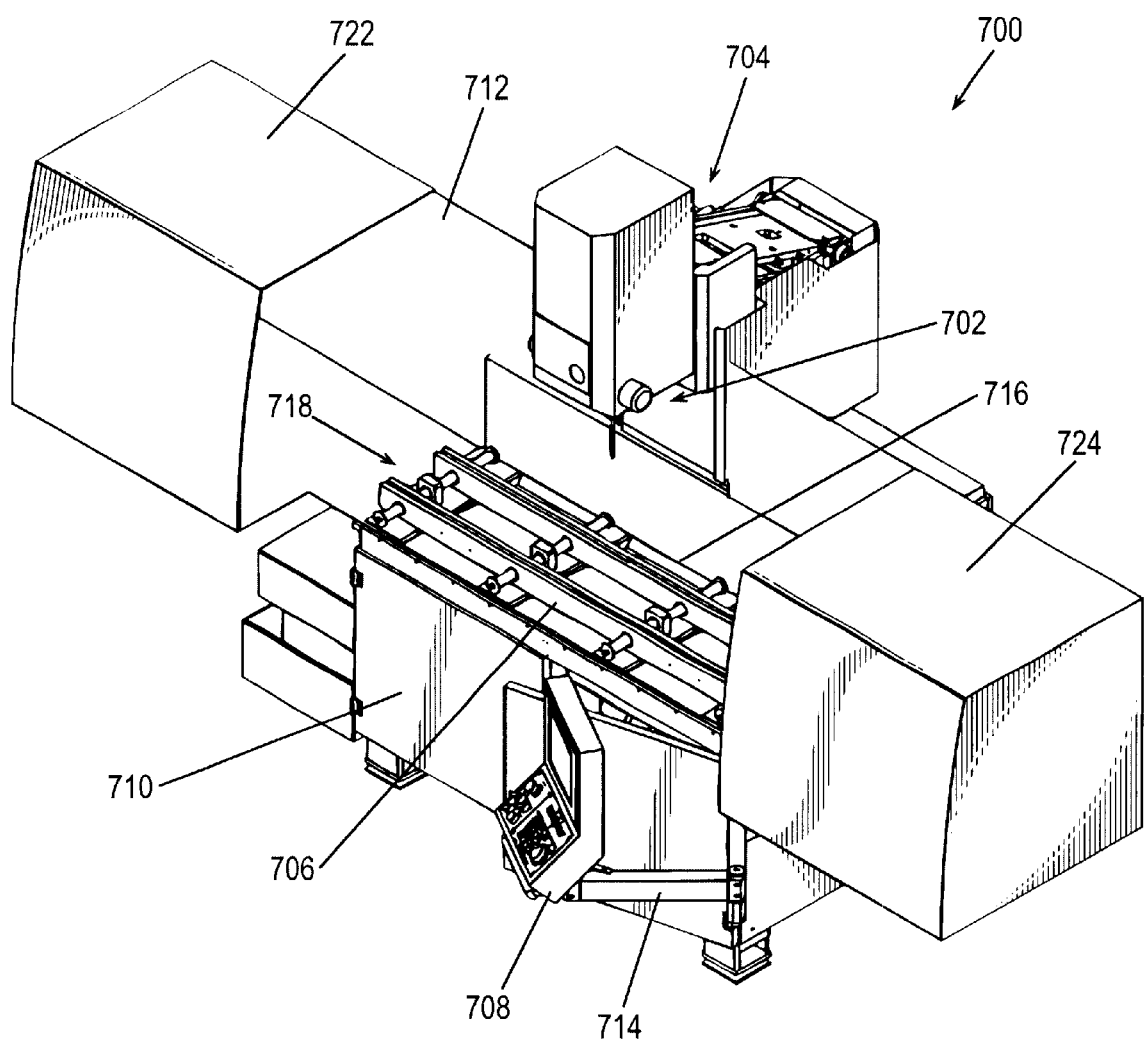
FIG. 19 is a perspective view of a system utilizing a contour machining head in accordance with the invention.
Figure 20:
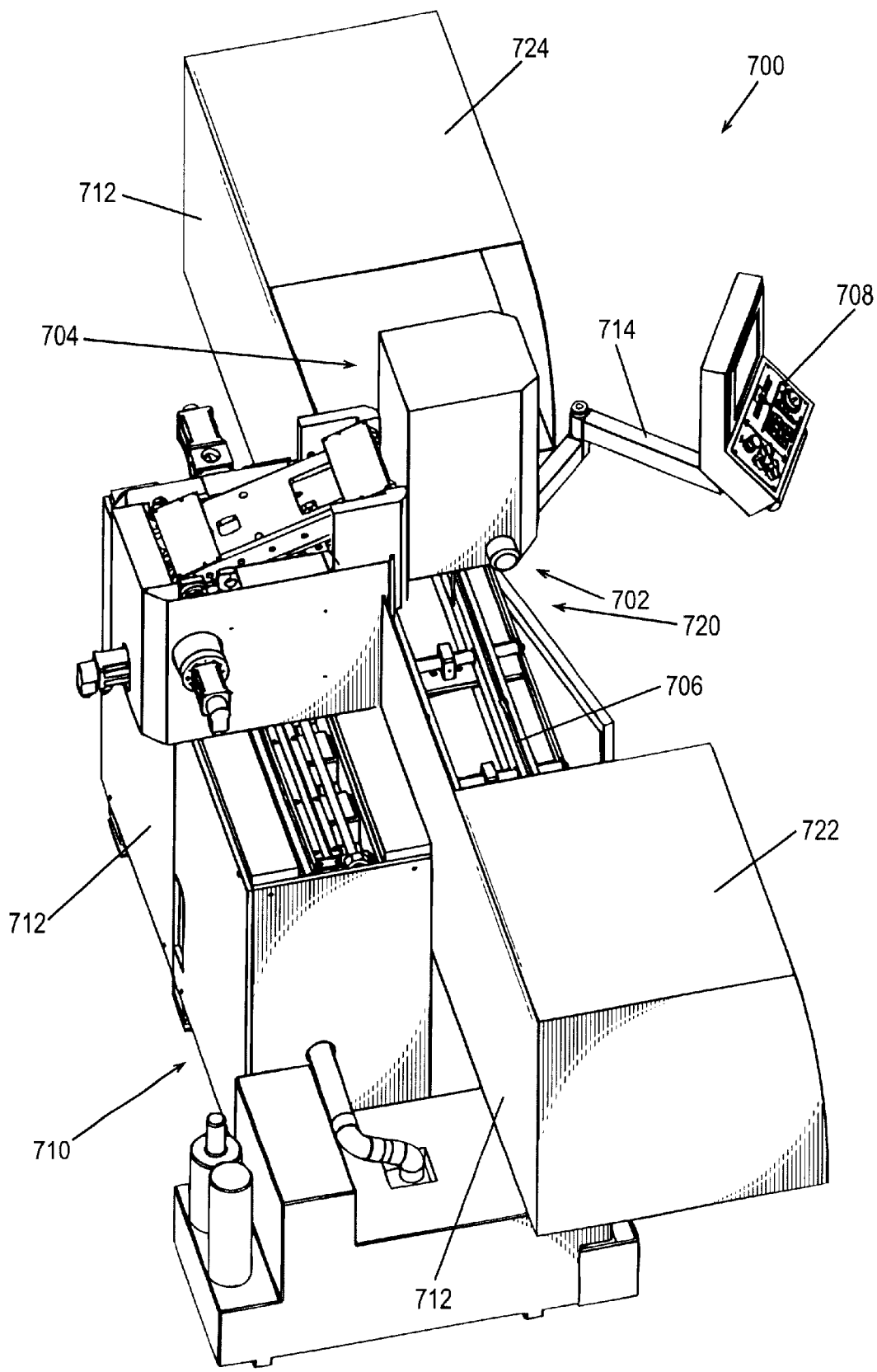
FIG. 20 is an overhead side perspective view the system utilizing the contour machining head shown in FIG. 19.

FIGS. 19 and 20 illustrate another embodiment of a line transfer system 700 with a contour machining head 702. A line transfer system 700 can be manufactured into a stand alone unit that is computer-controlled for ease of use. Referring to FIGS. 19 and 20, FIG. 19 is a perspective view, and FIG. 20 is an overhead side perspective view of the system 700, respectively. This embodiment of the system 700 includes a contour machining head 702 with a modularized drive system 704, a workpiece rack 706, computer 708, compartments 710, and a casing shield 712.

The contour machining head 702 is positioned relative to the modularized drive system 704. The modularized drive system 704 is configured to power the contour machining head 702, and can be similar to that shown and described in FIGS. 1–18. Both the contour machining head 702 and modularized drive system 704 are positioned in an overhead position relative to a workpiece (not shown) that can be positioned on or adjacent to the workpiece rack 706.

The workpiece rack 706 is configured as a series of tracks that provide clearance above and below the workpiece to be machined.

The computer 708 working in conjunction with a system controller (not shown) is configured to control and monitor the contour machining head 702 and modularized drive system 704. The computer 708 can be positioned on an associated swing arm 714 that pivots with respect to workpiece rack 706 for user convenience. An exemplary computer or similar processor-based platform for automatically controlling a line transfer system 700 is a computer with an Industrial BUS. A computer with an Industrial BUS can utilize a variety of conventional protocols such as BUS CAN, Ethernet, Profi BUS, S BUS, etc. This type of configuration can control the movement of a group of contour machining heads 702 as well as each individual contour machining head 702. The computer 708 is linked via cables, wireless, or other communication means to controls and motors associated with the contour machining head 702, in order to provide operational control of the line transfer system 700.

Compartments 710 positioned beneath the workpiece rack 706 provide storage and other useful user functions with respect to the line transfer system 700.

A casing shield 712 positioned along a rear side 716 of the workpiece rack 706 and on adjacent left and right sides 718, 720 of the workpiece rack 706 provide a physical safety barrier around the workpiece rack 706 during cutting or machining operations by the contour machining head 702 and may also serve as a splash guard to contain cooling liquid used during machining. Each of the left and right sides of the casing shield 712 are box-shaped hoods 722, 724 with an opening facing the workpiece rack 706.

The arrangement and operation of the system 700 shown in FIGS. 19–20 is substantially the same as that shown and described in FIGS. 13–18 above. The computer 708 can be programmed using methods and procedures as shown and described by related U.S. application Ser. No. 09/828,543, filed Apr. 6, 2001.

FIGS. 21–24 illustrate aspects of a line transfer system with a contour machining head. Each of these aspects can be incorporated, individually or in combination with each other, into a line transfer system with a contour machining head. Alternatively, each of these aspects can be incorporated, individually or in combination with each other, into a contour machining head. Note that applications of these aspects of a line transfer system with a contour machine head are not limited to engine cylinder head machining, but include any application in which a contoured machining operation is desired or otherwise required.

Figure 21:
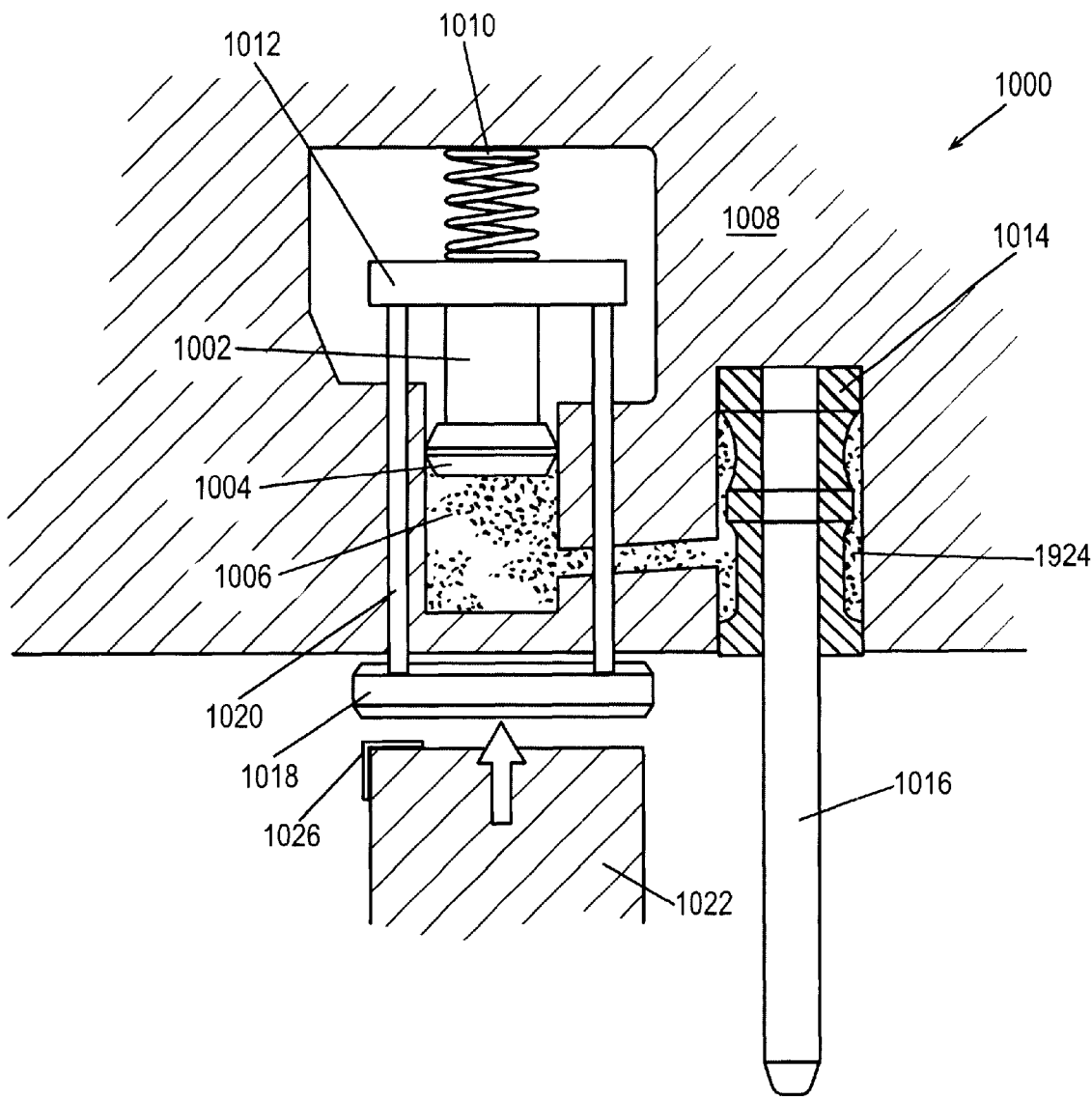
FIG. 21 is an illustration of an automatic pilot tensioner for a line transfer system with a contour machining head in accordance with the invention.

FIG. 21 illustrates an automatic pilot tensioner for a line transfer system with a contour machining head in accordance with the invention. The automatic pilot tensioner apparatus permits a pilot, reamer, or other type of guide of a cutting machine or contour machining head to be changed in a relatively efficient manner. In one embodiment of the apparatus shown in FIG. 21 as 1000, hydraulic pressure is generated by a spring-biased piston 1002 and seal 1004 which move within an oil-filled chamber 1006, all within a contour machining head body 1008. Bias compression spring 1010 presses against the upper side of the spring deck 1012 to maintain the position of the piston 1002, connected to the bottom side of the spring deck 1012. In this configuration, hydraulic oil pressure is applied to the deformable sleeve 1014 to lock the pilot/reamer 1016 in place. The spring deck 1012 is rigidly connected to release deck 1018 by two or more columns 1020, which maintain the decks 1012, 1018 so that they are parallel to each other. Release deck 1018 is located outside of the contour machining head body 1008, allowing access by release trigger 1022 which presses against the release deck 1018, causing the spring 1010 to be compressed, and releasing the hydraulic oil pressure on the hydraulic circuit 1024 and deformable sleeve 1014, allowing the pilot/reamer 1016 to be removed. Release trigger 1022 can be fixed on a surface below the contour machining head 1008 or attached to an associated robot arm.

In a fixed location implementation, the numerically controlled axes (x, y, z) of the contour machine head 1008 allow precise movement toward a tool crib/magazine with positions allocated for storing various tools. Once in position over the designated position for the given tool, fixed stop 1026 automatically unlocks the tool by activating the release trigger 1022 so that the tool is returned to its designated position in the tool crib/magazine.

In an alternate embodiment of an automatic pilot tensioner, the apparatus includes a first vertical pin which is movable to apply pressure to a piston in order to compress a spring in a locked position to secure the pilot in a locked position. The spring is of sufficient strength to secure the position of any type, shape, or size of pilot. Alternatively, the first vertical pin is movable to release the pressure on the piston in order to release the pilot from a locked position.

Either embodiment of the automatic pilot tensioner apparatus can be incorporated into a line transfer system with a contour machining head, as shown in FIGS. 13–20, or incorporated into a contour machining head for a line transfer system, as shown in FIGS. 1–12, for improvement to the automated operation of the system.

Figure 22:
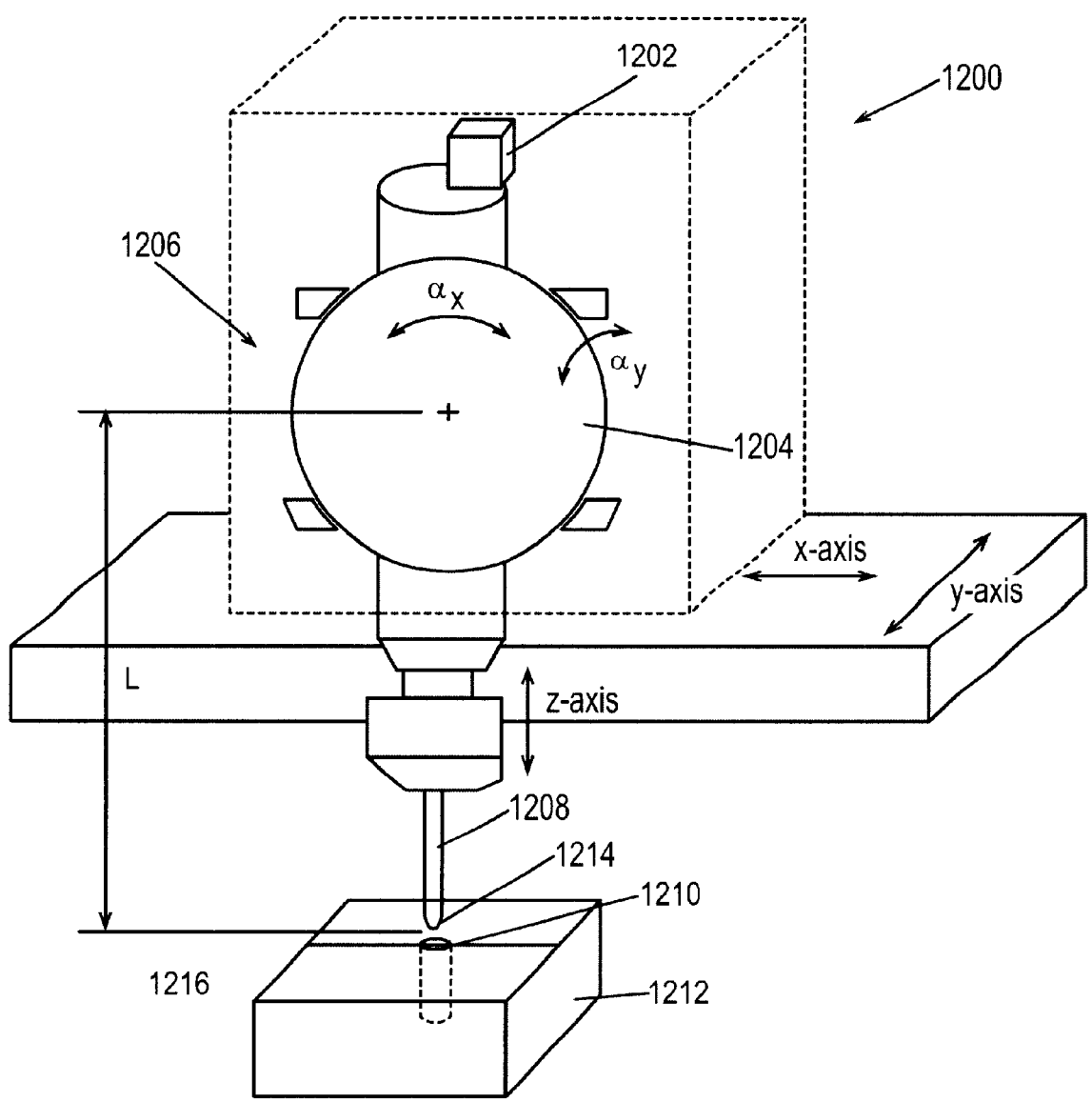
FIG. 22 is an illustration of an automatic pilot guide apparatus for a line transfer system with a contour machining head in accordance with the invention.

FIG. 22 is an illustration of an automatic pilot guide apparatus for a line transfer system with a contour machining head in accordance with the invention. The apparatus 1200 includes an inclinometer 1202 or other position measuring device. The inclinometer mounts to the machining sphere 1204 of the contour machining head 1206 or cutting machine. The inclinometer 1202 provides positional information to an associated system controller (not shown) consisting of the angular position of the machining sphere 1204 according to its two rotation axes.

As the distal end of a pilot 1208 approaches the entrance of a valve guide 1210 in a workpiece 1212, the system controller unlocks or otherwise frees the machine sphere 1204 to move or rotate. If the pilot 1208 is not exactly facing the valve guide 1210, the taper 1214 at the tip 1216 of the pilot 1208 will force the machine sphere 1204 to rotate. Note that the valve guide 1210 can also be a guide bore or other reference point in the workpiece 1212. This rotation, which is measured by the inclinometer 1202, will trigger the movement of the x and y axes in order to bring the machine sphere 1204 back to a vertical position. This automatically aligns the pilot 1208 with the valve guide 1210. The downward movement continues until the pilot 1208 has penetrated a few millimeters within the valve guide 1210.

At this point, the pilot 1208 has found the entrance of the valve guide 1210 and the pilot 1208 is in a substantially vertical position. The pilot can now be lowered into the valve guide 1210 while following the angle of the valve guide 1210. The system controller that controls the various axes will simulate the presence of a rotation axis located at the tip 1214 of the pilot 1208 as is the case of mechanical systems that use RCC (Remote Center Compliance), which is well known in the field of robotics.

The positions of the x axis are defined by the following equation:

$$dX = dZ \cdot \alpha_x - L \cdot d\alpha_x,$$

where dX is the derivative of the position of the X axis;
dZ is the derivative of the position of the Z axis;
$\alpha_x$ is the angle of the sphere relative to the x axis; and
L is the distance from the axis of rotation of the sphere to the virtual rotation axis at the tip of the pilot.

The term $dz \cdot \alpha_x$ corrects the angle of the guide. The term $L \cdot d\alpha_x$ simulates the rotational axis at the tip of the pilot.

The y axis obeys respectively to: $dy = dz \cdot \alpha_y - L \cdot d\alpha_y$

The apparatus 1200 provides a line transfer system with a contour machining head the capability of automated precision positioning and insertion of the pilot 1208 or reamer into a valve guide 1210, guide bore, or another reference point in the workpiece 1212. For example, positioning tolerances of 0.1 mm or less such as those found in valve guides of a cylinder head can be achieved by the apparatus 1200. Furthermore, the apparatus 1200 provides automatic and continuous movement of the pilot 1208 once the tip 1214 of the pilot 1208 has been engaged within the valve guide 1210. In some instances, it is critical to be able to continue the downward movement to insert the pilot 1208 fully within the valve guide 1210. Moreover, in some instances when the valve guide 1210 is not necessarily vertical, or when the valve guide may not be straight, the apparatus 1200 provides a line transfer system with a contour machining head the capability to combine downward movement of the pilot 1208 with simultaneous movement along the x and y axes.

Figure 23:
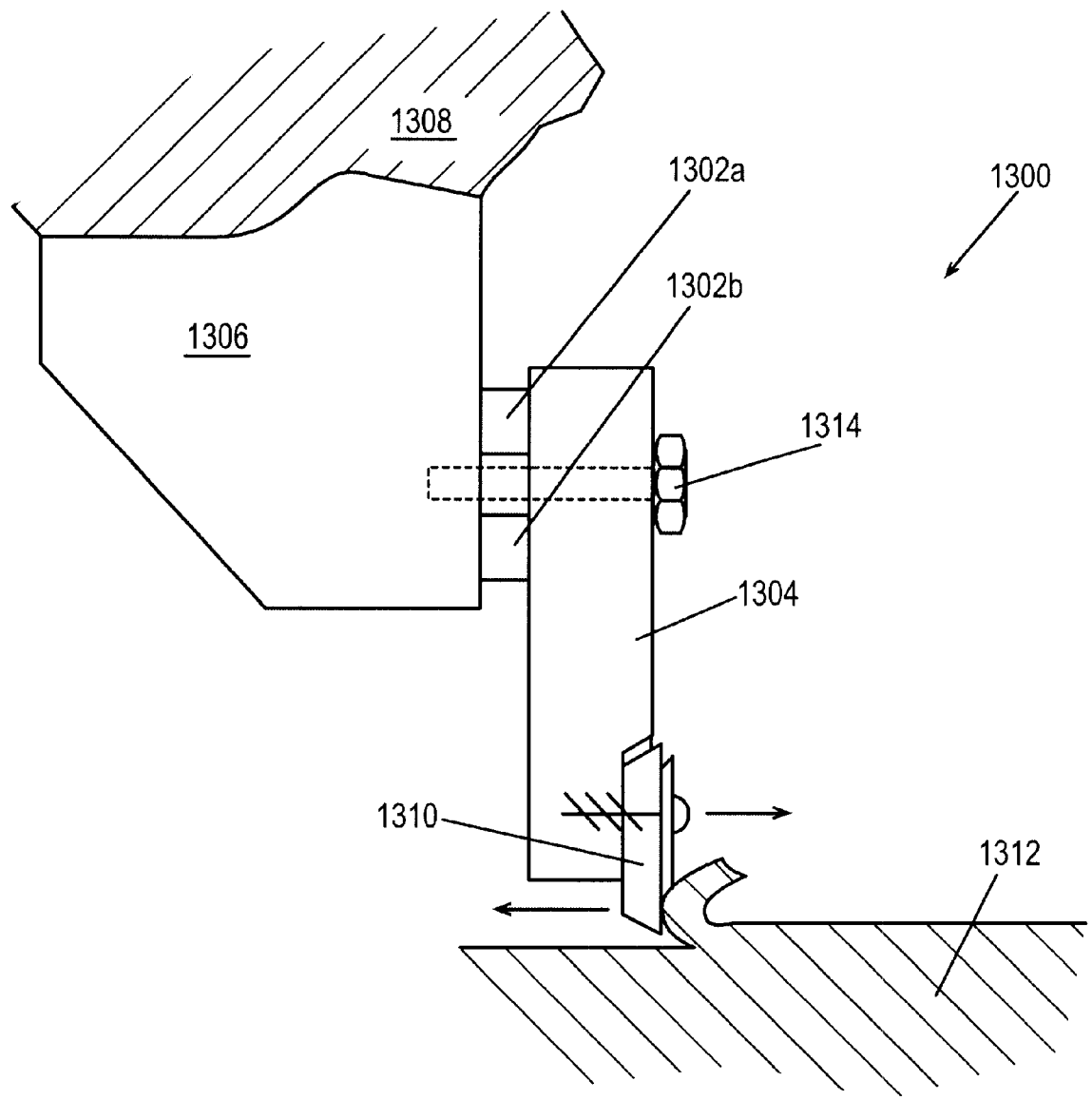
FIG. 23 is an illustration of a cutting force measurement apparatus for a line transfer system with a contour machining head in accordance with the invention.

FIG. 23 is an illustration of a cutting force measurement apparatus for a line transfer system with a contour machining head in accordance with the invention. The cutting force measurement apparatus 1300 permits a line transfer system with a contour machining head to determine the quality of a cutting operation with a particular bit tool. The apparatus 1300 includes one or more sensor elements 1302a–b such as a pair of piezoelectric crystals or piezoelectric elements. Note that the sensor elements 1302a–b can be another type of sensing element that can measure a differential in environmental characteristics caused by a cutting or bit tool operation. The sensor elements 1302a–b mount between a tip holder 1304 and a carriage 1306 of the contour machining head 1308. This arrangement permits the apparatus 1300 to measure the cutting/machining/contouring effort of an associated bit tool 1310 mounted to the tip holder 1304 by measuring the cutting effort at the bit tool 1310. The cutting effort corresponds to the resistance of a workpiece material 1312 being cut by the bit tool 1310, which produces a pressure or force differential between the sensor elements 1302a–b, i.e. increase in pressure on 1302b and a decrease in pressure on 1302a. A central "pivot" point between the two sensor elements 1302a–b is defined by fastener 1314. The difference between signals generated by the two sensor elements 1302a–b is converted by the system controller into a tension value which represents the cutting effort. By determining the ease or difficulty of the cut, the system controller can adjust the time, feed rate, rotational speed or other operating parameters of the line transfer system with a contour machining head as needed to ensure that the desired cut and finish is achieved.

The sensor element 1302 generates a signal which is used by an associated system controller (not shown) to assess whether a particular valve seat profile, or other machined feature, has been fully and properly cut. If the cutting effort is too great, i.e., the bit tool creates a significant amount of strain on the bit tool 1310, the contour machining head 1308 can automatically stop so as not to break the bit tool or another part of the contour machining head 1308. Such an instance might be where the bit tool 1310 encounters excessive resistance due to the hardness of the workpiece material 1312. If the cutting effort is insufficient, the contour machining head 1308 can automatically add additional machining cycles until the cut has been completed according to predetermined parameters.

Other embodiments and modifications of the invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A line transfer system for machining a workpiece, comprising:
   a transmission arbor mounted within a housing, the transmission arbor and housing sharing a common central axis;
   at least one contour machining head for mounting to the housing, comprising:
      a bit tool for machining the workpiece;
      a slidable carriage for mounting the bit tool;
      a linkage for transferring a force from the transmission arbor to the slidable carriage resulting in an independent radial movement of the bit tool with respect to the central axis; and
      a counterweight linked to the transmission arbor to dynamically counterbalance the radial movement of the slidable carriage and bit tool;

a pilot to align the contour machining head with the workpiece;

a driving system mounted to the housing, the driving system configured for, providing a force to the transmission arbor;

providing a force to the contour machining head resulting in an independent axial movement of the bit tool with respect to the central axis; and providing a force to the contour machining head resulting in an independent rotational movement of the bit tool with respect to the central axis; and a system controller configured to control the force applied by the driving system and the movement of the bit tool.

2. The system of claim 1, further comprising:

a workpiece rack for supporting the workpiece adjacent to the bit tool.

3. The system of claim 1, further comprising:

a casing for partially enclosing the workpiece rack.

4. The system of claim 1, wherein the bit tool is selected from the group consisting of a bit tool, a brush, and a drill.

5. The system of claim 1, wherein the linkage for transferring a force from the transmission arbor to the slidable carriage resulting in an independent radial movement of the bit tool with respect to the central axis, comprises:

a connecting rod linked to the transmission arbor, and configured for receiving the force from the transmission arbor;

a cantilever linked to the connecting rod, and configured for receiving the force from the connecting rod; and a second connecting rod linked to the cantilever and the carriage, and configured for transferring the force from the cantilever to the carriage.

6. The system of claim 1, wherein the counterweight linked to the transmission arbor to dynamically counterbalance the radial movement of the slidable carriage and bit tool, comprises:

a connecting rod linked to the counterweight, and configured for receiving a force from the counterweight;

a cantilever linked to the connecting rod, and configured for receiving the force from the connecting rod; and a second connecting rod linked to the cantilever and the transmission arbor, and configured for transferring the force from the cantilever to the transmission arbor.

7. The system of claim 1, wherein the driving system comprises:

a rotational drive motor linked to the transmission arbor;

an axial drive motor linked to the transmission arbor; and a motor linked to the housing.

8. The system of claim 1, wherein the system controller is further configured for executing a set of instructions for automating one or more movements of the bit tool.

9. The system of claim 1, further comprising:

an automatic pilot tensioner configured to selectively release the pilot from the contour machining head, and further configured to retain the pilot in a fixed position, wherein the automatic pilot tensioner comprises:

means for automatically biasing a pressure to release or retain the pilot with respect to the contour machining head; and a switch for activating the means for automatically biasing a pressure when the contour machining head is positioned in a predetermined location.

10. The system of claim 1, further comprising:

an automatic pilot guide configured to provide positional information of the contour machining head to the system controller, and further configured to position the pilot at a predetermined area of the workpiece; wherein the automatic pilot guide comprises:

means for determining an angular position of the contour machining head with respect to a rotational axis;

means for orienting the contour machining head in a relatively vertical position with respect to the common central axis; and means for lowering the pilot with respect to the predetermined area of the workpiece.

11. The system of claim 1, further comprising:

a force measurement apparatus configured to measure the force applied by the bit tool; wherein the cutting force measurement apparatus comprises:

a sensor adjacent to the carriage and the bit tool and configured to generate a signal corresponding to a pressure differential on the carriage caused by a movement of the bit tool with respect to the workpiece; and a processor configured to receive the signal and configured to determine the force upon the bit tool from the pressure differential on the carriage caused by the movement of the bit tool with respect to the workpiece.

12. A method for machining a plurality of workpieces, comprising:

mounting a transmission arbor within a housing, the transmission arbor and housing sharing a common central axis;

mounting at least one contour machining head to the housing, the contour machining head comprising:

a bit tool for machining the workpiece;

a slidable carriage for mounting the bit tool;

a linkage for transferring a force from the transmission arbor to the slidable carriage resulting in an independent radial movement of the bit tool with respect to the central axis;

a pilot to align the contour machining head with the workpiece; and dynamically balancing the radial movement of the slidable carriage and bit tool with a counterweight linked to the transmission arbor;

activating a driving system mounted to the housing, the driving system configured for, providing a force to the transmission arbor;

providing a force to the contour machining head resulting in an independent axial movement of the bit tool with respect to the central axis; and providing a force to the contour machining head resulting in an independent rotational movement of the bit tool with respect to the central axis; and monitoring the force applied by the driving system and the movement of the bit tool with a system controller.

13. A line transfer system for machining a plurality of workpieces, comprising:

a plurality of transmission arbors mounted within respective housings, the transmission arbors and their respective housings sharing a respective common central axis;

a plurality of contour machining heads for mounting to a respective housing, each contour machining head comprising:

a bit tool for machining a respective workpiece;

a carriage for mounting the bit tool;

a linkage for transferring a force from the transmission arbor to the carriage resulting in an independent radial movement of the bit tool with respect to a respective central axis;

a pilot to align the contour machining head with the workpiece; and a counterweight to dynamically counterbalance the radial movement of the respective carriage and bit tool;

a driving system configured for providing a force to each transmission arbor;

providing a force to the contour machining head resulting in an independent axial movement of the bit tool with respect to its respective central axis; and providing a force to the contour machining head resulting in an independent rotational movement of the bit tool with respect to its respective central axis; and a system controller configured to control the forces applied by the driving system and the movements of the bit tools.

14. A line transfer system with a contour machining head for machining a workpiece, comprising:

a housing;

a transmission arbor mounted within the housing, the transmission arbor and housing sharing a common central axis;

a bit tool for machining the workpiece;

a slidable carriage for mounting the bit tool;

a linkage for transferring a force from the transmission arbor to the slidable carriage resulting in an independent radial movement of the bit tool with respect to the central axis;

a pilot to align the contour machining head with the workpiece; and a counterweight to dynamically counterbalance the radial movement of the slidable carriage and bit tool;

a linkage for transferring a force caused by the mass and movement of the counterweight to the transmission arbor;

a driving system mounted to the housing, the driving system configured for, providing a force to the transmission arbor;

providing a force to the contour machining head resulting in an independent axial movement of the bit tool with respect to the central axis; and providing a force to the contour machining head resulting in an independent rotational movement of the bit tool with respect to the central axis; and a system controller configured to control the force applied by the driving system and the movement of the bit tool.

15. The system of claim 14, further comprising:

a workpiece rack for supporting the workpiece adjacent to the bit tool.

16. The system of claim 14, further comprising:

a casing for partially enclosing the workpiece rack.

17. The system of claim 14, wherein the bit tool is selected from the group consisting of a bit tool, a brush and a drill.

18. The system of claim 14, wherein the linkage for transferring a force from the transmission arbor to the slidable carriage resulting in an independent radial movement of the bit tool with respect to the central axis, comprises:

a connecting rod linked to the transmission arbor, and configured for receiving the force from the transmission arbor;

a cantilever linked to the connecting rod, and configured for receiving the force from the connecting rod; and a second connecting rod linked to the cantilever and the carriage, and configured for transferring the force from the cantilever to the carriage.

19. The system of claim 14, wherein the counterweight linked to the transmission arbor to dynamically counterbalance the radial movement of the slidable carriage and bit tool, comprises:

a connecting rod linked to the counterweight, and configured for receiving a force from the counterweight;

a cantilever linked to the connecting rod, and configured for receiving the force from the connecting rod; and a second connecting rod linked to the cantilever and the transmission arbor, and configured for transferring the force from the cantilever to the transmission arbor.

20. The system of claim 14, wherein the driving system comprises:

a rotational drive motor linked to the transmission arbor;

an axial drive motor linked to the transmission arbor; and a motor linked to the housing.

21. The system of claim 14, wherein the system controller is further configured for executing a set of instructions for automating one or more movements of the bit tool.

22. The system of claim 14, further comprising:

an automatic pilot tensioner configured to selectively release the pilot from the contour machining head, and further configured to retain the pilot in a fixed position, wherein the automatic pilot tensioner comprises:

means for automatically biasing a pressure to release or retain the pilot with respect to the contour machining head; and a switch for activating the means for automatically biasing a pressure when the contour machining head is positioned in a predetermined location.

23. The system of claim 14, further comprising:

an automatic pilot guide configured to provide positional information of the contour machining head to the system controller, and further configured to position the pilot at a predetermined area of the workpiece; wherein the automatic pilot guide comprises:

means for determining an angular position of the contour machining head with respect to a rotational axis;

means for orienting the contour machining head in a relatively vertical position with respect to the common central axis; and means for lowering the pilot with respect to the predetermined area of the workpiece.

24. The system of claim 14, further comprising:

a force measurement apparatus configured to measure the force applied by the bit tool; wherein the cutting force measurement apparatus comprises:

a sensor adjacent to the carriage and the bit tool and configured to generate a signal corresponding to a pressure differential on the carriage caused by a movement of the bit tool with respect to the workpiece; and a processor configured to receive the signal and configured to determine the force upon the bit tool from the pressure differential on the carriage caused by the movement of the bit tool with respect to the workpiece.

* * * * *